United States Patent
Wildschek

(10) Patent No.: US 9,242,723 B2
(45) Date of Patent: Jan. 26, 2016

(54) METHOD AND APPARATUS FOR MINIMIZING DYNAMIC STRUCTURAL LOADS OF AN AIRCRAFT

(75) Inventor: Andreas Wildschek, Riemerling (DE)

(73) Assignee: EADS DEUTSCHLAND GmbH, Ottobrunn (DE)

( * ) Notice: Subject to any disclaimer, the term of this patent is extended or adjusted under 35 U.S.C. 154(b) by 52 days.

(21) Appl. No.: 14/125,031

(22) PCT Filed: May 24, 2012

(86) PCT No.: PCT/EP2012/059718
§ 371 (c)(1),
(2), (4) Date: Feb. 20, 2014

(87) PCT Pub. No.: WO2012/168086
PCT Pub. Date: Dec. 13, 2012

(65) Prior Publication Data
US 2015/0028162 A1    Jan. 29, 2015

(30) Foreign Application Priority Data
Jun. 10, 2011 (EP) .................................... 11169531

(51) Int. Cl.
*B64C 13/16* (2006.01)
*G05D 1/00* (2006.01)
*G05D 1/02* (2006.01)
*G05D 1/06* (2006.01)

(52) U.S. Cl.
CPC *B64C 13/16* (2013.01); *G05D 1/00* (2013.01); *G05D 1/0066* (2013.01); *G05D 1/0204* (2013.01); *G05D 1/0623* (2013.01)

(58) Field of Classification Search
CPC ........ B64C 13/16; G05D 1/0066; G05D 1/00; G05D 1/0623; G05D 1/0204
See application file for complete search history.

(56) References Cited

U.S. PATENT DOCUMENTS

| | | | | |
|---|---|---|---|---|
| 2,962,243 A | * | 11/1960 | Coleman et al. | 244/177 |
| 3,814,912 A | * | 6/1974 | Manke et al. | 701/6 |
| 5,186,416 A | * | 2/1993 | Fabre et al. | 244/191 |
| 5,375,794 A | * | 12/1994 | Bleeg | 244/76 C |

(Continued)

FOREIGN PATENT DOCUMENTS

| | | |
|---|---|---|
| DE | 198 41 632 A1 | 3/2000 |
| DE | 10 2008 014 236 A1 | 9/2009 |

(Continued)

OTHER PUBLICATIONS

The extended European search report of corresponding European application No. 11169531.8-1754, issued on Jun. 19, 2013.

(Continued)

*Primary Examiner* — Mary Cheung
*Assistant Examiner* — Rodney Butler
(74) *Attorney, Agent, or Firm* — Global IP Counselors, LLP

(57) ABSTRACT

A method of dynamically alleviating loads generated on an aircraft by a disturbance of gust and/or turbulence. The method comprises monitoring, during flight of the aircraft, to automatically detect a disturbance due to gust and/or turbulence and determining an incidence angle or angle of attack of the disturbance. When a disturbance due to gust and/or turbulence is detected, automatically generating control commands for deflecting control surfaces dependent on the incidence angle or angle of attack, and applying the control commands to deflect the control surfaces.

20 Claims, 15 Drawing Sheets

(56) References Cited

U.S. PATENT DOCUMENTS

| | | | | |
|---|---|---|---|---|
| 5,995,880 | A * | 11/1999 | Larramendy et al. | 701/4 |
| 6,044,311 | A * | 3/2000 | Larramendy et al. | 701/10 |
| 6,161,801 | A * | 12/2000 | Kelm et al. | 244/76 C |
| 6,416,017 | B1 * | 7/2002 | Becker | 244/76 C |
| 2004/0079835 | A1 * | 4/2004 | Volk | 244/76 C |
| 2008/0265104 | A1 | 10/2008 | Fabre-Raimbault et al. | |
| 2009/0084908 | A1 * | 4/2009 | Wildschek et al. | 244/76 R |
| 2009/0157239 | A1 * | 6/2009 | Walton et al. | 701/6 |
| 2010/0012789 | A1 * | 1/2010 | Hillgren et al. | 244/175 |
| 2010/0171002 | A1 * | 7/2010 | Hahn | 244/76 C |
| 2011/0134412 | A1 * | 6/2011 | Inokuchi | 356/28.5 |
| 2011/0184591 | A1 * | 7/2011 | Kordt | 701/3 |
| 2011/0266399 | A1 * | 11/2011 | Blanc et al. | 244/76 C |
| 2014/0306067 | A1 * | 10/2014 | Guida | 244/199.4 |

FOREIGN PATENT DOCUMENTS

| | | |
|---|---|---|
| EP | 1 814 006 A1 | 8/2007 |
| EP | 1 854 717 A1 | 11/2007 |
| GB | 2 136 746 A | 9/1984 |

OTHER PUBLICATIONS

The International Search Report for the corresponding international application No. PCT/EP2012/059718, issued on Jan. 7, 2014.
The Written Opinion of the International Searching Authority for the corresponding international application No. PCT/EP2012/059718.

* cited by examiner

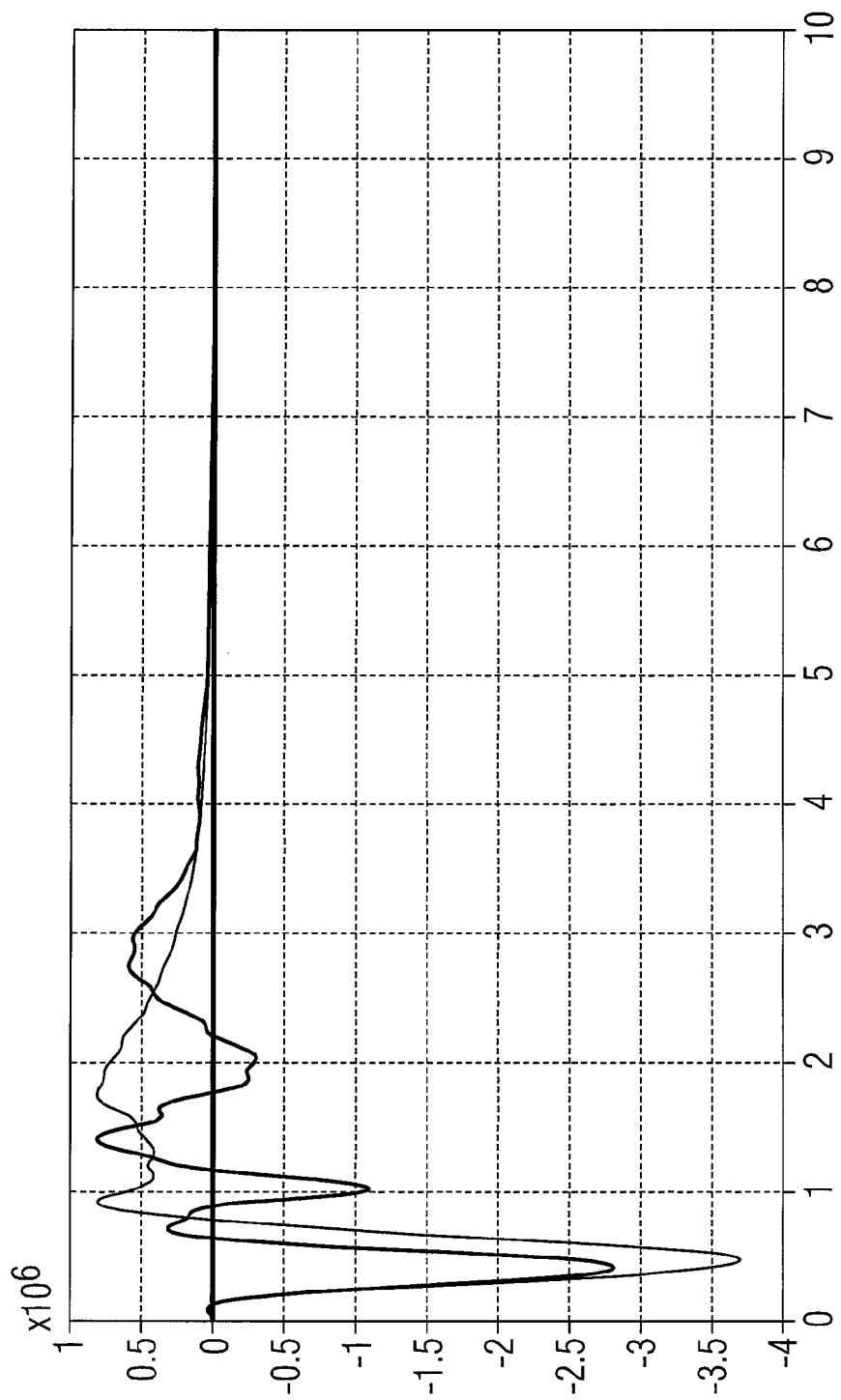

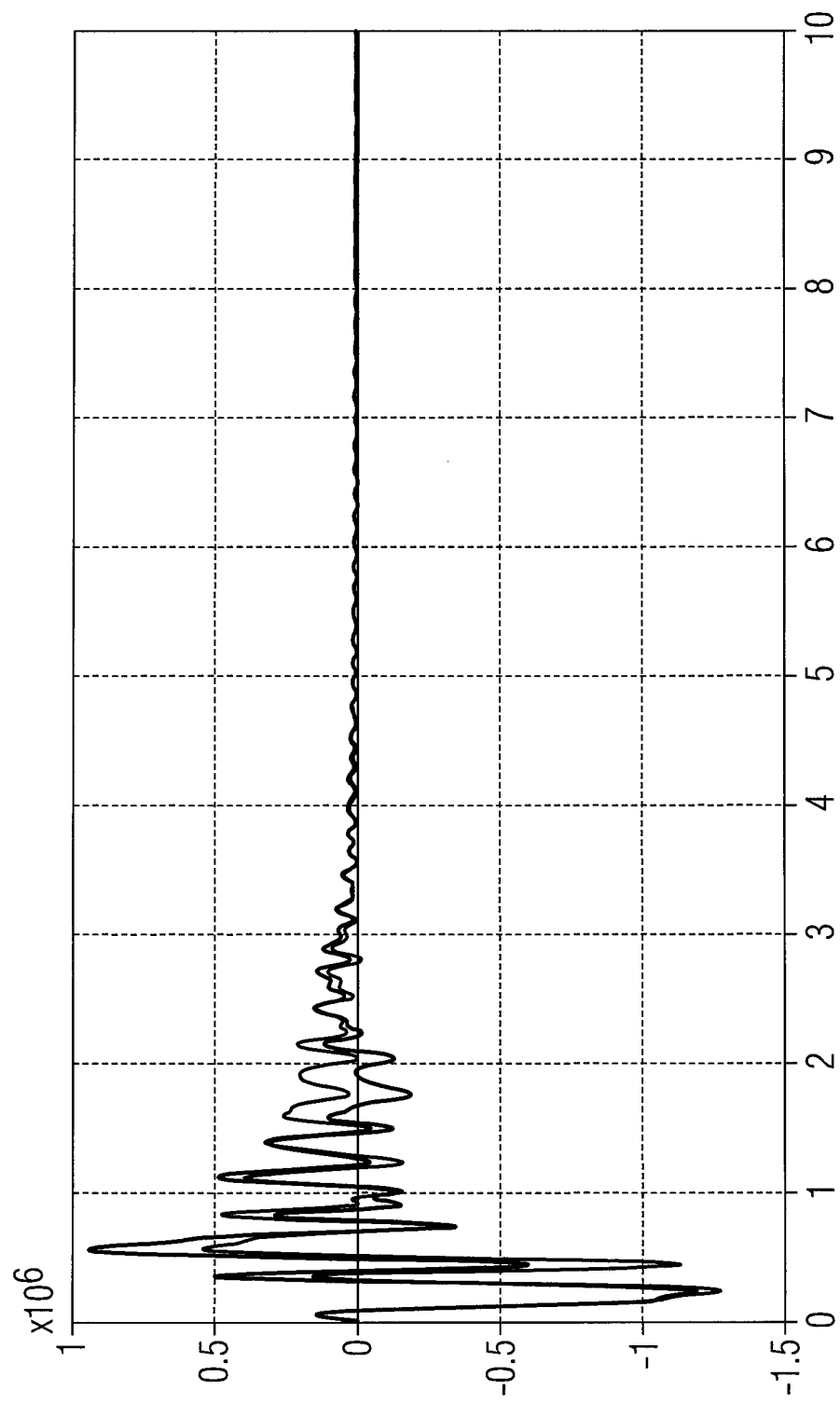

METHOD AND APPARATUS FOR MINIMIZING DYNAMIC STRUCTURAL LOADS OF AN AIRCRAFT

CROSS-REFERENCE TO RELATED APPLICATIONS

This U.S. National stage application claims priority under 35 U.S.C. §119(a) to European Patent Application No. 11 169 531.8, filed on Jun. 10, 2011, the entire contents of European Patent Application No. 11 169 531.8 are hereby incorporated herein by reference.

BACKGROUND

1. Field of the Invention

The invention relates to minimizing dynamic structural loads of an aircraft, introduced by an external excitation to the same.

2. Background Information

Dynamic structural loads are introduced to the structure of an aircraft by external excitations, e.g. due to wind, gusts, turbulences or similar influences, and by excitations due to pilot/flight control system demands. As a result of the flexible properties of the aircraft structure, such excitation may result in oscillations or vibrations that may exceed a given magnitude, so that they can be harmful to the aircraft structure, especially of frequencies in the range of natural or characteristic oscillations of the flexible aircraft structure. If it is desired to reduce the mass of the aircraft structure at high aspect ratio of wing and fuselage, it is necessary to take measures against excessive dynamic structural loads.

Atmospheric gusts excite dynamic wing loads especially in the wing roots as well as vertical accelerations critical for passenger safety. Besides manoeuvre loads these loads are sizing for the aircraft structure. If it is possible to reduce said loads, then a lighter wing design is possible, improving fuel efficiency and thus reducing direct operating costs. Another advantage is the increase of passenger safety due to alleviation of vertical accelerations.

Document DE 198 41 632 C2 discloses a method for compensating structural oscillations of an aircraft, which are introduced by an external excitation, comprising detecting at least one body rate of the aircraft with a sensor arrangement, providing said at least one body rate to a flight controller, and producing movements of control surfaces of the aircraft to minimize the excited oscillations.

For updraft gust the first load peak can be eliminated by a rapid deflection of spoilers on the upper wing surface, see Airbus patent US 20080265104 A. This approach is limited by control authority (reaction time, actuator power), by the loads that the rapid spoiler deflection introduces to the wing structure, as well as by the constraint that the second peak of the wing bending acceleration must not be increased by the spoiler deflection.

EP 1 814 006 A1 proposes the symmetric actuation of ailerons for gust load alleviation using a high pass filtered alpha probe signal as reference for the gust and an adaptive feed-forward controller. This approach solves the problems mentioned above, but is even more limited by the control authority of the ailerons.

Further apparatuses and methods for reducing vibrations due to gust are disclosed in DE 10 2008 014 236 A1 and in EP 1 854 717 A1. In EP 1 854 717 A1, there is disclosed how control commands for alleviating disturbances can be generated. DE 10 2008 014 236 A1 describes an apparatus and a method for adaptive control.

SUMMARY

The object of the invention is to provide an optimized method and an optimized apparatus for alleviation of dynamic structural loads on aircraft due to gust (and turbulence).

This object is achieved by a method and an apparatus as defined in the independent claims.

Advantageous embodiments of the invention form the subject-matter of the dependent claims.

According to one aspect, the invention provides a method of dynamically alleviating loads generated on an aircraft by a disturbance of gust and/or turbulence, the method comprising the steps of:
  on a flight of the aircraft, a monitoring is applied for automatically detecting a disturbance due to gust and/or turbulence and determining an incidence angle or angle of attack of the disturbance;
  when a disturbance due to gust and/or turbulence is detected, automatically generating control commands for deflecting control surfaces dependent on the incidence angle or angle of attack; and
  applying the control commands to deflect the control surfaces;
wherein the method further comprises conducting the following step:
A) adapting the control commands not only to the amount of the incidence angle or angle of attack but also to the gust length in order to adapt the deflection of the control surfaces both to the incidence angle or angle of attack and the gust length.

According to another aspect, the invention provides a method of dynamically alleviating loads generated on an aircraft by a disturbance of gust and/or turbulence, the method comprising the steps of:
  on a flight of the aircraft, a monitoring is applied for automatically detecting a disturbance due to gust and/or turbulence and determining an incidence angle or angle of attack of the disturbance;
  when a disturbance due to gust and/or turbulence is detected, automatically generating control commands for deflecting control surfaces dependent on the incidence angle or angle of attack; and
  applying the control commands to deflect the control surfaces;
wherein the method further comprises conducting the following step sequence
B) generating first control commands for first control surfaces for alleviation of dynamic loads due to turbulence and generating second control commands for second control surfaces for alleviation of gust loads,
  comparing the incidence angle or angle of attack with a predetermined value and
  generating the first control commands in order to actuate the first control surface until the incidence angle or angle of attack reaches this predetermined value and
  generating the second control commands to add a deflection of the second control surfaces when the incidence angle or the angle of attack is above the predetermined value.

According to another aspect, the invention provides a method of dynamically alleviating loads generated on an aircraft by a disturbance of gust and/or turbulence, the method comprising the steps of:
  on a flight of the aircraft, a monitoring is applied for automatically detecting a disturbance due to gust and/or turbulence and determining an incidence angle or angle of attack of the disturbance;
  when a disturbance due to gust and/or turbulence is detected, automatically generating control commands for deflecting control surfaces dependent on the incidence angle or angle of attack; and
  applying the control commands to deflect the control surfaces;
wherein the method further comprises conducting the following step sequences
A) adapting the control commands not only to the amount of the incidence angle or angle of attack but also to the gust length in order to adapt the deflection of the control surfaces both to the incidence angle or angle of attack and the gust length; and
B) generating first control commands for first control surfaces for alleviation of dynamic loads due to turbulence and generating second control commands for second control surfaces for alleviation of gust loads,
  comparing the incidence angle or angle of attack with a predetermined value and
  generating the first control commands in order to actuate the first control surface until the incidence angle or angle of attack reaches this predetermined value and
  generating the second control commands to add a deflection of the second control surfaces when the incidence angle or the angle of attack is above the predetermined value.

Preferably, the first control surfaces are operated in a continuous dynamic manner in order to reduce loads generated by turbulence. Preferably, the second control surfaces are control surfaces that are deflected or kicked out in a short time in order to compensate a short disturbance such like a gust. The first and second control surfaces can be the same control surfaces. For example, ailerons may be actuated symmetrically in a continuous dynamic way to compensate disturbances due to a turbulence, but, additionally, in case of a gust, ailerons, spoilers and/or elevators may be additionally deflected or kicked out. Thus, in this example, the ailerons are used as first control surfaces while the ailerons, spoilers and/or elevators are used as second control surfaces.

Preferably, an additional dynamic incidence angle of the disturbance is detected and the type of the disturbance (e.g. gust or turbulence) and/or the strength and/or a length thereof is determined based on this additional dynamic incidence angle. Further, a signal representing the additional dynamic incidence angle (or angle of attack of the disturbance) may be used as basis to generate a second control command, eventually by adding delays and/or gains to this signal and/or by filtering this signal.

According to one aspect of the invention a method of dynamically alleviating loads generated on an airplane by a disturbance of gust and/or turbulence comprises the steps of:
i) on a flight of the airplane, a monitoring is applied for automatically detecting a disturbance due to gust and/or turbulence and providing disturbance parameters characterizing the additional dynamic incidence angle (or angle of attack) of the disturbance, the gust length and gust strength;
ii) when a disturbance due to gust and/or turbulence is detected, automatically generating control commands for deflecting control surfaces dependent on the disturbance parameters; and
iii) applying the control commands to activate or deflect the control surfaces; wherein step ii) comprises generating first control commands for first control surfaces and second control commands for second control surfaces,
wherein the strength of the disturbance is compared with a predetermined strength and wherein the first control commands are generated when the strength is below the predetermined strength and the second control commands are generated when the strength is above the predetermined strength so that solely the first control surfaces are activated until the strength reaches the predetermined strength and that the second control surfaces are deflected when the strength is above the prescribed strength.

The invention provides both the advantages of the prior art according to US20080265104 and EP 1 814 006 A1. Optimum performance on alleviation of updraft and downdraft gust is achieved. According to one embodiment, the method and apparatus are using at least two different kinds of control surfaces. For example, not only spoilers are used, but also at least on further or all other available control surfaces, e.g. symmetrical actuated ailerons. There is proposed a sophisticated logic that uses a first type of control surfaces, for example the ailerons, only up to a prescribed gust strength (in order to keep a margin for roll control) and then adds deflection of another type of control surfaces. For example, more and more spoiler deflection is added the higher the gust strength.

In an advantageous embodiment, a high pass filtered signal of the alpha vane is used for both, triggering the spoilers as well as dynamically actuating the symmetrically driven ailerons and elevators.

According to an embodiment of the invention, the first control commands include aileron control commands for activating an aileron control surface and/or elevator control commands for actuating an elevator control surface and the second control commands include spoiler control commands for deflecting spoiler control surfaces arranged on an upper and/or lower surface of a wing of the airplane.

Preferably, both the first and second control surfaces are used during high strength disturbance. Thus, according to an embodiment, both the first and second type control surfaces are deflected in case when the strength is higher than the predetermined strength.

According to one embodiment, the strength of the disturbance is determined using the methods as known from US2008/0265104 A1 and/or EP 1 814 006 A1. It is preferred that the strength of the disturbance is determined using the additional dynamic incidence angle.

According to a further embodiment, the control commands are adapted not only to the gust strength, but also to the gust length.

The most important advantage of a preferred embodiment of the invention when compared to US20080265104 is that control surfaces such as the spoilers are not just deflected and retracted after a certain prescribed time in accordance with the gust strength, but also in accordance with the gust length. Thereby, the control authority of the controls surfaces, especially of spoilers, is fully exploited. Moreover also for downdraft gust the delayed spoiler deflection alleviates the first positive peak of the wing bending, according to a further embodiment. An advantage of embodiments of the invention is, that peak loads (i.e. first peak and subsequent peaks) induced by strong gust can be optimally alleviated, for updraft as well as for downdraft gust of all gust lengths with the available control authority/actuator bandwidth.

From EP 1 854 717 A1, it is known that alpha wind can be computed, however vertical speed does not need to be delayed because it changes slowly, and delay is bad for reaction time.

It is preferred that in step sequence A) a deflection angle and/or a deflection hold time for the control surface is adapted to the gust length.

It is further preferred that step sequence A) comprises
a) comparing the control command and an actual deflection of the control surface,
b) detecting when the actual deflection of the control surface matches the control command, and
c) checking, after a delay time after a detection of a match in step b), whether the control command still is present by determining whether it exceeds a lower limit or is still unequal to zero,
d) and holding the control surface constant for a prescribed holding time in case that the control command still is present, and retracting the control surface in case that the control command is not present after the delay time.

According to an embodiment of the invention step sequence A) comprises:
e) identifying a gradient of the incidence angle
f) generating the control commands to open the control surface when the incidence angle is increasing; and
g) generating the control commands to hold the control surface constant for a prescribed holding time when the incidence angle is decreasing.

According to a further aspect of the invention step sequence A) comprises:
h) identifying when the incidence angle goes below a certain threshold and, if so, generating the control commands to hold the control surface constant for a prescribed holding time.

According to further aspect of the invention step sequence A) comprises: generating a signal indicative of the external excitation and using the length of the signal for adapting the control commands to the gust length.

In a preferred embodiment of this further aspect of the invention, the alternative A) comprises generating a signal indicative of the external excitation (this signal may be or include e.g. an additional dynamic incidence angle alpha_wind induced by a gust) applying said signal to a filter means that is responsive to the length of the signal, and using the filtered signal to generate the control commands adapted to the gust length. For example, the signal is applied to a filter logic that blocks short signals, attenuates signals with a medium length and feeds long signals forward. Such filter logic may include a FIR filter.

It is preferred that step sequence B) is conducted in such way that solely the first control surfaces are actuated until the incidence angle reaches the predetermined value and that the second control surfaces are deflected when the incidence value is above the prescribed value,
and preferably in such way, that in case when the incidence angle is higher than the prescribed value both the first and second type control surfaces are deflected.

In a preferred embodiment, the first control commands are only generated when the additional dynamic incidence angle is higher than a first predetermined value of incidence angle, and the second control commands are generated when the additional dynamic incidence angle is higher than a second predetermined value of incidence angle. Thus, the prescribed value as mentioned above may be the second predetermined value of incidence angle. Compared to the second predetermined value, the first predetermined value of incidence angle may be lower by a factor of 10 to 100.

According to one optional embodiment, the generating of first control commands is stopped temporarily when the incidence angle exceeds the prescribed value so that second control commands are generated. Thus, full control authority for the second control commands is provided.

According to a further embodiment of the invention, the first control commands include
aileron control commands for actuating an aileron control surface and/or elevator control commands for actuating an elevator control surface, and
the second control commands include spoiler control commands for deflecting spoiler control surfaces arranged on an upper and/or lower surface of a wing of the airplane.

According to a preferred embodiment, the first control commands are more continuous signals leading to a continuous, especially oscillating, moving of control surfaces in order to reduce loads generated by turbulences, while the second control commands are short time, impulse-like incidences leading to a kind of kick of the control surface (that is eventually held in the deflected position) in order to reduce loads generated by gusts. A difference between loads generated by turbulence and loads generated by gusts is that turbulence loads normally result in continuous loads with small amplitudes (fatigue stress) while gust loads normally result in single peak loads that may bring the structure close to the ultimate load.

The invention further provides an apparatus for dynamically alleviating loads generated on an aircraft by a disturbance of gust and/or turbulence, comprising:
monitoring means for automatically detecting a disturbance due to gust and/or turbulence and providing a parameter representing the incident angle or angle of attack of the disturbance;
control command generating means for automatically generating control commands for a deflecting control surface dependent on the incident angle or angle of attack;
characterized in that
the apparatus comprises adaptation means, for example a control allocation logic, to adapt the control commands not only to the amount of the incidence angle or angle of attack but also to the gust length.

According to an advantageous embodiment of the apparatus, the adaptation means is configured to adapt a deflection angle and/or a deflection hold time for the control surface to the gust length.

It is further preferred that the apparatus comprises a switch means for switching an activator of the control surface,
wherein the switch means is configured to switch between a feed through mode for feeding the control command to the activator and a hold value mode for holding an initial value of the control command constant and for feeding this constant value to the activator for a predetermined holding time.

It is further preferred that the adaptation means comprises a command difference detection means for determining a difference between the control command generated by the control command generating means and an actual deflection of the control surface wherein the adaptation means is configured to adapt the control command in response to a difference determined by the command difference detection means.

Preferably, the switch means is connected to the command difference detection means and is configured to switch between the feed-through mode and the hold value mode dependent on the difference determined by the command difference detection means.

An alternative embodiment uses one or more filters instead of switches to adapt the control commands to the gust length.

For example, the filters are responsive to the length of the signals and feed forward signals dependent on the length thereof.

According to a further embodiment, the apparatus comprises:
first actuators to activate first control surfaces responsive to the control commands and second actuators to deflect second control surfaces; wherein said control command generating means is configured to generate first control commands for said first control surfaces and second control commands for said second control surfaces, and
a comparison means for comparing the incidence angle or angle of attack with a predetermined value, wherein said control command generating means is configured to generate the first control command when the incidence angle is below the predetermined strength and to generate the second control command when the incidence angle is above the predetermined value.

Preferably, the first actuators controlled by the first control command are configured to actuate an aileron control surface and/or an elevator control surface, and the second actuators controlled by the second control command are configured to deflect spoiler control surfaces arranged on an upper surface of a wing of the airplane and or to deflect spoiler control surfaces arranged on a lower surface of the wing.

It is further preferred that the control command generating means is configured to generate both the first and second control commands when the strength is higher than the predetermined strength.

A further embodiment of the method according to the invention is characterized by the step of
detecting a condition indicative of an end and/or a turn of the disturbance and generating first closing commands for closing the first control surfaces and second closing commands for closing the second control surface when such condition arises, wherein the first closing command and the second closing command are generated at different times after detecting such condition.

It is possible that one of the first and second closing commands immediately follows the end and/or turn of the disturbance so that one of the first type and second type control surfaces is closed faster than the other of the first type and second type control surfaces.

For example, a delay of a deflection of a spoiler arranged on an upper wing surface can alleviate the first positive peak of the wing bending also for downdraft gusts.

According to one embodiment of the invention, the method further comprises generating a signal indicative of the external excitation; deriving signals of pre-controlling for actuating control elements of the aircraft from said excitation indicating signal in accordance with a pre-controlling rule, so as to reduce the dynamic structural loads introduced to the aircraft; generating an error signal representing performance of said pre-controlling; optimizing the pre-controlling rule by said error signal and/or said excitation indicating signal so as to minimize the dynamic structural loads.

The generating said signal representing performance of said pre-controlling as an error signal may be indicative of structural loads of the aircraft structure.

Generating said excitation indicating signal may include detecting signals indicating one or more of intensity and direction of turbulence, wind and gusts, angle of attack, angle of yaw, and Euler-angles. Information of pilot/FCS demand may be used for excitation identification in order to minimize pilot-induced loads/vibrations.

Generating said error signal may include detecting signals indicating one or more of accelerations, stresses or strains at given locations of the aircraft structure.

The generating of said error signal may include subtracting contributions of pilot or flight controller commands to control surfaces of the aircraft, which are included in the structural loads. Said subtracting the influence of pilot or flight controller commands may be carried out on the basis of a rigid body model of the aircraft.

Said excitation indicating signal may be generated from a flexible body model of the aircraft, or an observer/Kalman filter.

Said optimizing the pre-controlling rule may include frequency separation for subtracting the influence of pilot or flight controller commands. Optimizing the pre-controlling rule may include an iterative algorithm.

The method provides actuating of control surfaces so as to minimize dynamic structural loads. This may include actuating one or more of elevator, rudder, aileron, spoiler or other control surfaces of the aircraft. Said actuating may include actuating one or more of electro-mechanical, electro-magnetic, hydraulic, pneumatic or piezoelectric actuators to introduce load damping forces directly into the aircraft structure.

Optimizing said pre-controlling rule may include generating a transfer function or any other mathematical model, of the aircraft.

Said generating of the transfer function may be carried out by an online-system-identification comprising filtering band-limited random noise or chirp signal or any other identification signal by a number of n adaptive filters, wherein n corresponds to the number of the aircraft transfer functions to be identified, and subtracting the filtering response in vector form from the error signal.

According to a further alternative aspect, the invention provides an apparatus for dynamically alleviating loads generated on an airplane by a disturbance of gust and/or turbulence, comprising:
monitoring means for automatically detecting a disturbance due to gust and/or turbulence and providing disturbance parameters characterizing an incident angle (or angle of attack of the disturbance) and the strength of the disturbance;
control command generating means for automatically generating control commands for actuating and/or deflecting control surfaces dependent on the disturbance parameters; and
first activators to actuate first control surfaces responsive to the control commands and second activators to deflect second control surfaces;
wherein said control command generating means is configured to generate first control commands for said first control surfaces and second control commands for said second control surfaces,
characterized by
a comparison means for comparing the strength of the disturbance with a predetermined strength,
wherein said control command generating means is configured to generate the first control command when the strength is below the predetermined strength and to generate the second control command when the strength is above the predetermined strength.

It is preferred that the first actuators controlled by the first control command are configured to actuate an aileron control surface and/or an elevator control surface, and
the second actuators controlled by the second control command are configured to deflect spoiler control surfaces arranged on an upper surface of a wing of the airplane and/or to deflect spoiler control surfaces arranged on a lower surface of the wing.

According to an embodiment of the apparatus, the control command generating means is configured to generate both the first and second type control command when the strength is higher than the predetermined strength.

A further embodiment is characterized in that the comparison means is configured to determine the strength of the disturbance from an angle of wind attack.

A still further embodiment of the apparatus is characterized in that the control command generating means is configured to generate first closing commands for closing the first control surfaces and second closing commands for closing the second control surface in response to a condition indicative to an end or a turn of the disturbance, wherein the first type closing command and the second type closing command are generated at different times after detecting such condition.

It is preferred that the control command generating means is configured such that one of the first and second closing commands immediately follows the end and/or turn of the disturbance for closing one of the first type and second type control surfaces earlier than the other of the first type and second type control surfaces.

A preferred embodiment of the apparatus further comprises an excitation signal generating arrangement for generating a signal indicative of an external excitation of the aircraft structure; a regulating circuit for deriving pre-controlling signals from said excitation indicating signal in accordance with a pre-controlling rule, for actuating control elements of the aircraft so as to reduce the dynamic structural loads introduced to the aircraft; an error signal generating arrangement for generating a signal representing performance of said pre-controlling as an error signal; an optimizing circuit for optimizing the pre-controlling rule by said error signal and/or excitation indicating signal so as to minimize the dynamic structural loads.

Said error signal generating arrangement may be provided for generating said signal representing performance of said pre-controlling as an error signal to be indicative of structural loads of the aircraft structure.

Said excitation signal generating arrangement may include sensor means for detecting signals indicating one or more of intensity and direction of turbulence, wind and gusts, angle of attack, angle of yaw, and Euler-angles.

Said error signal generating arrangement may be provided for detecting signals indicating one or more of accelerations, stresses or strains at given locations of the aircraft structure. Further, the error signal generating arrangement may be provided for subtracting contributions of pilot or flight controller commands to control surfaces of the aircraft, which are included in the structural loads.

Said error signal generating arrangement may also be provided for subtracting the influence of pilot or flight controller commands on the basis of a rigid body model of the aircraft.

Said excitation signal generating arrangement may be provided for generating the excitation indicating signal from a flexible body model of the aircraft, or observer/Kalman filter.

Said optimizing circuit may include a frequency separator for optimizing the pre-controlling rule by frequency separation in order to be able to cancel out frequency ranges, where controller shall not have any influence. Said optimizing circuit may be provided for optimizing the pre-controlling rule by an iterative algorithm.

Control surfaces, which are actuated so as to minimize dynamic structural loads, may include one or more of elevator, rudder, aileron, spoiler or other control surfaces of the aircraft. Control elements, which are actuated so as to minimize dynamic structural loads, may include such control surface and one or more electro-mechanical, electro-magnetic, hydraulic, pneumatic or piezoelectric actuators for introducing load alleviating forces directly into the aircraft structure.

Said optimizing circuit may be provided for generating a transfer function of the aircraft for optimizing said pre-controlling rule. The optimizing circuit may also be provided for generating the transfer function by an online-system-identification which comprises filtering band-limited random noise or a chirp signal by a number of n adaptive filters, wherein n corresponds to the number of the aircraft transfer functions to be identified, and for subtracting the filtering response in vector form from the error signal.

Embodiments of the invention will now be described with reference to the appended drawings.

DESCRIPTION OF THE DRAWINGS

FIG. 14 shows the incremental wing root bending moment for the GLAS of FIG. 11 for a medium gust of 250 feet;

FIG. 15 shows the incremental wing root bending moment for the GLAS of FIG. 11 for a short gust of 60 feet

DETAILED DESCRIPTION OF EMBODIMENTS

Figure 1:
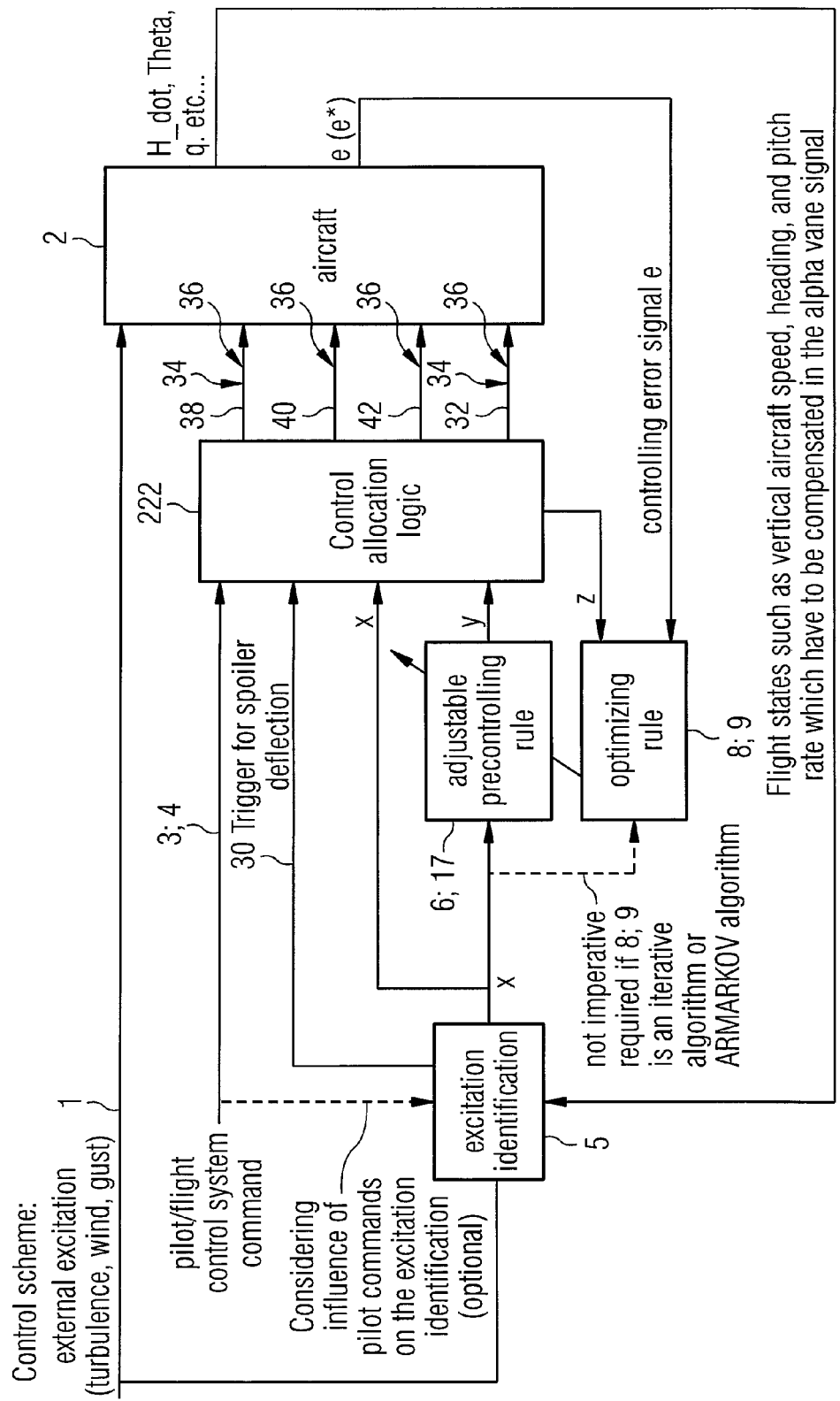
FIG. 1 is a block diagram for disclosing method and apparatus of minimizing dynamic structural loads introduced by an external or pilot/FCS excitation to an aircraft, in accordance with one embodiment of the invention.

FIG. 1 shows one principle embodiment of minimizing dynamic structural loads of an aircraft 2, which are introduced by an external excitation 1. The external excitation 1 may e.g. be wind, gusts or turbulences. The excitation 1 causes dynamic structural loads in the structure of the aircraft 2, especially by natural or characteristic oscillations within the structure due to flexible body properties of the same. In FIG. 1, the excitation 1 is introduced to the aircraft 2, which is regarded as a flexible body.

The excitation 1 is detected by an excitation or reference sensor 5, which is generating a signal x indicative of the external excitation 1, the reference sensor 5 being in this case one or more sensors or a sensor arrangement. The signal x indicative of the external excitation 1 is input to an adaptive pre-control circuitry 6, 17 for deriving control signals y for actuating control elements of the aircraft 2 in accordance with a pre-controlling rule, which is implemented in said adaptive pre-control circuitry 6, 17. The control signals y for actuating control elements reduce the dynamic structural loads, which are introduced to the aircraft 2 by the external excitation 1. The control signals y are output to the aircraft 2 so as to actuate the control elements, which are provided in the same.

The control signals y especially include a first control command 34 for actuating first control surfaces for dynamic wing load alleviation. In one example, the first control surfaces are ailerons which are actuated symmetrically. Hence, in this example, the first control command 34 is a symmetric aileron command 32 for dynamic wing load alleviation.

In the aircraft 2 is generated a signal indicative of structural loads which are introduced to the same by said external excitation 1, which signal is used as an error signal e, e* and which is describing control performance of the pre-controlling rule of circuitry 6, 17. The error signal e, e* is input to a circuitry 8, 9 for optimizing the pre-controlling rule by said error signal e, e*, so as to minimize the dynamic structural loads, i.e. to reduce the amplitude of the oscillations within the structure of the aircraft 2. The optimization in circuitry 8, 9 is performed in a way that a minimization of the oscillations and of the dynamic structural loads is adapted to actual load and flight conditions of the aircraft 2. If the optimizing rule is not iterative, the signal x is also used for optimizing the adjustable pre-controlling rule of circuitry 6, 17.

The pre-controlling rule can be adjusted based on measurement of e.g. Mach number and/or dynamic pressure, and/or any other parameter based on a pre-defined adjustment rule.

The reference sensor 5 may comprise a number of sensors, which detect intensity and direction of wind, turbulence and gusts, angle of attack, angle of yaw, etc., e.g. as Euler-angles. The error signal e, e* which is detected by error sensors in the aircraft 2, may include accelerations at different given locations of the aircraft structure, as well as stresses or strains at given locations at the aircraft structure, for example. The control elements of the aircraft 2, which are actuated in order to minimize the dynamic structural loads, may include spoilers, elevator, rudder, aileron or other control surfaces, and they may include electro-mechanical, electro-magnetic, hydraulic, pneumatic or piezoelectric actuators for directly introducing load damping forces into the aircraft structure. First control surfaces may be moved continuously, especially in an oscillating manner, to alleviate loads induced by turbulence. Such first control surfaces include elevator, rudder and/or aileron, Second control surfaces may be deflected in a more or less sudden single movement to alleviate loads induced by a gust. Such second control surfaces include especially upper spoilers on an upper wing surface and/or lower spoilers on a lower wing surface, but may also include elevator, rudder and/or aileron.

Especially, the signal of the reference sensor 5 is used as a trigger 30 for spoiler deflection.

Further, as a specific option, also pilot or flight control system commands 3, 4, which may also induce unwanted structural loads and vibrations in the aircraft 2, are added to the excitation indication signal x. Thus, also structural loads and vibrations of the aircraft due to pilot or flight system commands are minimized.

In FIG. 1, the reference signs can be explained as follows:
x conditioned reference signal for the adjustable pre-controlling rule as well as for the optimization rule, as well as for actuating the spoilers;
y includes symmetric aileron command for dynamic wing load alleviation;
e. e.g. measure for wing bending vibration excitation, i.e. modal wing bending acceleration sensor, or measurement of forces, moments or strains;
H_dot vertical aircraft speed
Theta Heading
q pitch rate
z information about saturation and rate exceedance of ailerons required for adaptation of the optimizing rule;
222 control allocation logic: Inputs (from top): Pilot command (e.g. vertical acceleration command, pitch rate command, heading command, alpha command, or roll command, or a combination, etc. . . . ), spoiler trigger, conditioned reference signal x for generating control commands for the control surfaces, and signal y. Outputs (from top): Elevator command, upper wing surface spoiler commands, lower wing surface spoiler commands, symmetric aileron commands.

All other reference signs are explained in EP 1 854 717 A1, and it is expressly referred to this document for further details: The optimization of the pre-controlling rule may be carried out in accordance with an appropriate method, i.e. methods of least mean square root errors or recursive methods of least mean square root errors (LMS, RLS) or methods of minimizing quadratic cost function or methods for the minimization of the L-infinity norm. For further details with regard to the generation of the error signal and with regard to the elements 5, 6, 17, 8, 9 and 2, it is referred to EP 1 814 006 A1 wherein same elements as in FIG. 1 are described using the same reference numbers. Thus, EP 1 814 006 A1 describes preferred embodiments for these elements and the function thereof in more detail.

In addition to the method and apparatus as described and disclosed in EP 1 814 006 A1, a control allocation logic 222 is used in the present method and apparatus, as indicated in FIG. 1. Inputs for the control allocation logic 222 include pilot commands 3 and flight control commands 4, spoiler trigger 30, conditioned reference signal x for generating control commands for the control surfaces, and the signal y including the symmetric aileron command. Outputs of the control allocation logic include first control commands 34 for actuating first control surfaces and second control commands 36 for deflecting second control surfaces.

The pilot command 3 and flight control command 4 can be or include, for example, a vertical acceleration command, a pitch rate command, a heading command, an alpha command or a roll command or any combination of these commands.

The first control commands 34 include elevator commands 38 and symmetric aileron commands 32. The second control commands 36 include upper wing surface spoiler commands 40 and, optionally, lower wing surface spoiler commands 42 where lower wing surface spoilers may be present. The presence of such lower wing surface spoilers and the lower wing surface spoiler commands 42 are not necessary for the operation of the method and apparatus as described therein, but may be an additional option. The second control commands 36 can also include aileron and/or elevator commands 32, 38.

Further, the control allocation logic 222 provides information z about saturation and rate exceedance of ailerons. This information is delivered to the circuits 8, 9 for adaptation of the optimizing rule.

In the following the operation of logic 222 is explained. The objective of logic 222 is to let the aircraft 2 perform the manoeuvres commanded by the pilot, and at the same time minimizing structural loads induced by manoeuvre and gusts, considering the rate limitations and saturations of all available control surfaces. The logic 222 obtains information 3, 4, x about pilot command 3 and external excitation 1 (such as gust, turbulence, wind).

The logic 222 will for example mainly use the elevator for a pitch or vertical acceleration command. Simultaneously the ailerons are dynamically deflected in order to reduce the pilot induced wing bending. The outboard spoilers (as is already state-of-the-art) are deflected in order to get the lift more inboard and thus reduce the wing root bending moment.

A gust which is identified by reference sensor 5 excites the wing bending and induces high dynamic wing root loads. For strong gusts the authority of the ailerons is not sufficient. So the logic 222 symmetrically commands the ailerons dynamically for wing bending vibration compensation up to a prescribed limit. In one embodiment including upper wing and lower wing spoilers, the remaining share of gust load (that cannot be alleviated by the ailerons) may be, for example, alleviated by alternate deflection of upper wing and lower wing spoilers.

Note: Unlike for a conventional control surface, a spoiler can only be deflected in one direction, i.e. an upper wing surface spoiler can only be deflected upwards, and (if available as in another further completion) a lower wing surface spoiler can only be deflected downwards. When actuated alternately, then a pair of upper and lower wing spoiler can act like a dynamically commanded control surface.

In the present embodiments, an additional dynamic incidence angle $\alpha_{wind}$ is used as the signal x indicative of the external excitation. Thus, in the present embodiments, signal x equals or corresponds to $\alpha_{wind}$.

Regarding details of the excitation identification by reference sensor 5, it is referred to EP 1 854 717 A1 which explains how $\alpha_{wind}$ can be computed from the alpha probe measurement, which is also recalled in US20080265104.

Thus, the measurable angle of attack at the alpha probe mounting position $\alpha_{air}$, (i.e. the angle between the aircraft, and the velocity vector of the airflow) can be split up into:

$$\alpha_{air} = \alpha_{wind} + \alpha_0 + \alpha_{ground} = \alpha_{wind} + \alpha_0 + \alpha_{ground_{OL}} + \alpha_{ground_{CL}} \quad \text{Eq. (1)}$$

Thereby, $\alpha_0$ denotes the static angle of attack of the trimmed aircraft in a ground reference system. The static angle of attack $\alpha_0$ can easily be erased by a high-pass filter. The alpha probe mounting node's angle of attack deviation from this static value $\alpha_0$ in a ground reference system is denoted $\alpha_{ground}$. The feed-forward GLAS (GLAS is an abbreviation of gust load alleviation system) however requires $\alpha_{wind}$ as reference signal. So $\alpha_{ground}$ needs to be subtracted from the measured $\alpha_{air}$ in order to get the required $\alpha_{wind}$. In order to compute $\alpha_{ground}$ mainly pitch rate and vertical speed are required.

The formula of EP 1 854 717 A1 for $\alpha_{wind}$ is:

$$\alpha_{wind} = \cos(\Phi)\left[\arcsin\left(\frac{\dot{H}}{VTAS}\right) - \Theta + \cos(\Phi) \cdot \left(\alpha_{air} + \frac{q \cdot r_{AoA}}{VTAS}\right) + \sin(\Phi) \cdot \left(\beta - \frac{r \cdot r_{AoS}}{VTAS}\right)\right] \quad \text{Eq. (2)}$$

Thereby, $\phi$ is the bank angle, $\dot{H}$ is the aircraft's inertial vertical speed, VTAS is the flight velocity of the aircraft with regard to the surrounding air, $\Theta$ is the pitch angle, $\alpha_{air}$ is the measured angle of attack, $\beta$ is the sideslip angle, r is the yaw rate, $r_{AoA}$, and $r_{AoS}$ are the distances from the centre of gravity to the alpha and to the beta sensor respectively. For further details and explanation, it is expressly referred to EP 1 854 717 A1.

Since e.g. the vertical speed is computed by the IMU by complementary filtering this signal is delayed more than the other signals, which can be directly measured, such as the angle of attack of the alpha probe. In EP 1 854 717 A1 it is proposed to artificially delay also the other signals so the equation for computation of alpha wind is mathematically correct. However this introduces a delay on the reference signal required for feed-forward gust load alleviation which is bad for reaction time of the GLAS. For the present new method and apparatus it was found that vertical speed does not need to be delayed because it changes very slowly anyhow. So the present method and apparatus also provide faster reaction time and thus better performance than the system described in EP 1 854 717 A1.

Note, that the signal $\alpha_{ground}$ can be split up into an open loop share $\alpha_{ground_{OL}}$, and into a closed loop share $\alpha_{ground_{CL}}$. The open loop share $\alpha_{ground_{OL}}$ is due to two effects, which are related to rigid body motions and structural vibrations:

I. Aircraft reactions to manoeuvres: Aircraft reactions to manoeuvres can affect the alpha probe measurement, but must not be interpreted as disturbance in order to prevent the adaptive feed-forward wing bending vibration controller from counteracting any pilot commands.

II. Aircraft reactions to turbulence/gust: The alpha probe measurement of aircraft reactions to turbulence does not contain any lead-time information about the turbulence, and thus can cause a non-causal share in the optimum feed-forward wing bending vibration controller. In the frequency range of structural Eigen modes however this effect is negligibly small.

The closed loop share $\alpha_{ground_{CL}}$, which is due to the coupling between the feed-forward control input "y" and the alpha probe measurement, can even destabilize the system. The control path from "y" to $\alpha_{air}$ is therefore called parasitic feedback path.

Figure 2:
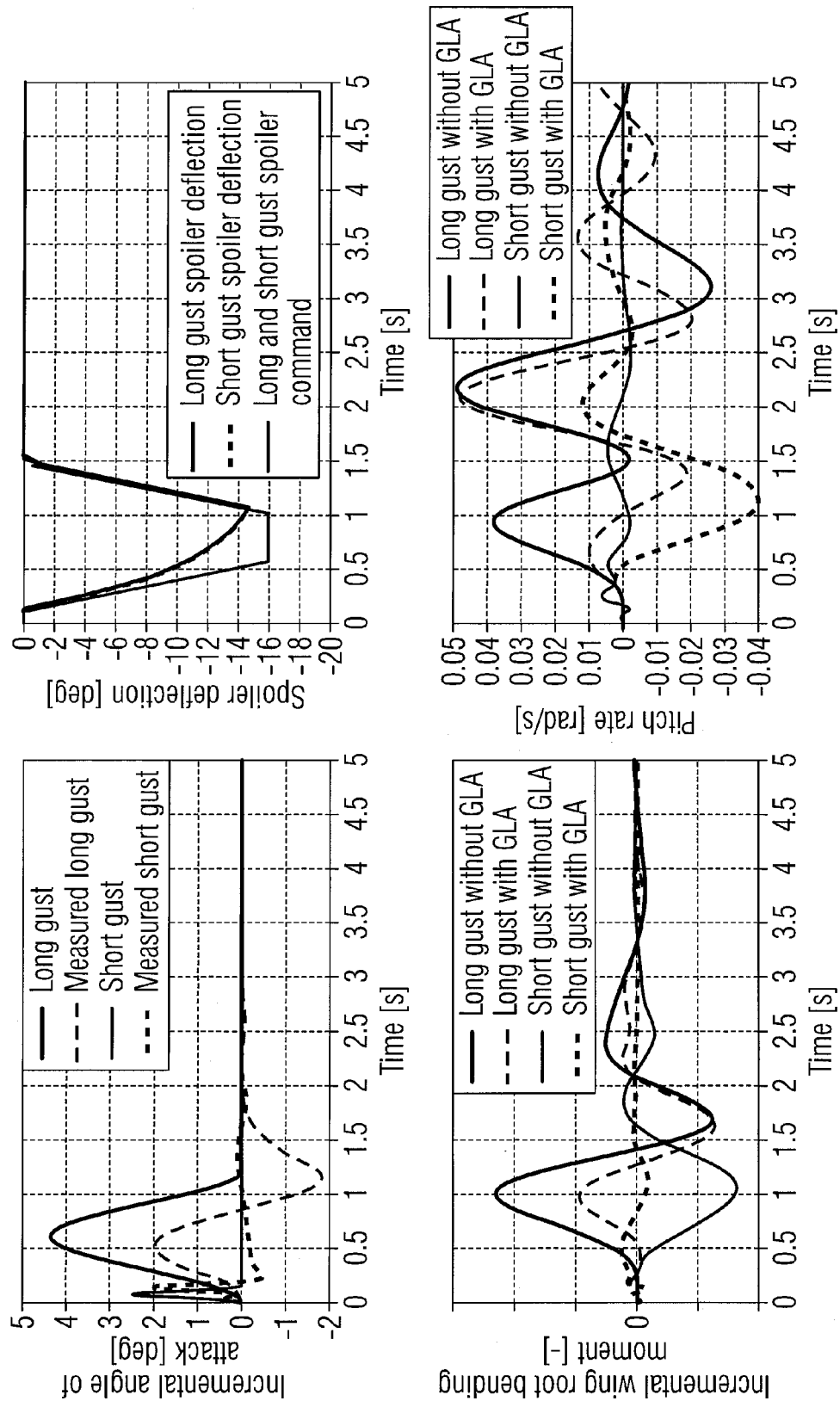
FIG. 2 show four diagrams of a numeric simulation of a gust load alleviation system (GLAS) according to the state of the art as known from US20080265104.

In US20080265104 A1, it is suggested that depending on the gust excited incidence angle alphaGLA a certain deflection of the control surfaces (e.g. spoilers) is commanded regardless the specific properties of the gust such as the gust length. This is dangerous because applying the same spoiler deflection on two gusts of same amplitude but different lengths might reduce the loads for the long gust, but increase the loads for the short gust, as will be shown in the following example with an updraft gust, i.e. up blow:

US20080265104 suggests that for a certain incremental angle of attack due to gust "alphaGLA" (which presumably is equal to $\alpha_{wind}$ in the present method) a certain spoiler deflection is commanded. FIG. 2 shows a numeric simulation with an implementation of the teaching of US20080265104. Simulating such a GLAS with a long gust of 500 feet gust gradient distance (see blue line in left upper plot), a 16° spoiler deflection is commanded (i.e. −16° in aircraft coordinate system) as well as respective elevator deflections for pitch moment compensation, see green line in right upper plot. The left bottom plot shows the incremental wing root bending moment without GLAS (blue line) and with GLAS (blue dashed line). A reduction of more than 50% is achieved. In order to check for flight mechanic behaviour the right bottom plot shows the pitch rate without GLAS (blue line) and with GLAS (blue dashed line).

The term "gust gradient distance" means a distance parallel to the airplane's flight path for the gust to reach its peak velocity, see FAR "Code of Federal Regulations".

For a short gust of 60 feet gust gradient distance with same measured level of alphaGLA ($\alpha_{wind}$ respectively), i.e. dashed blue and red lines in left upper plot have the same maximum, the same spoiler deflection leads to an increase of incremental wing root bending moment (especially in the negative direction, i.e. downward bending), compare red solid line with red dashed line of left bottom plot.

Thus, performance of such GLAS is limited by how much down-bending induced by over-compensation of short gusts the aircraft structure (wing structure) can withstand.

Figure 3:
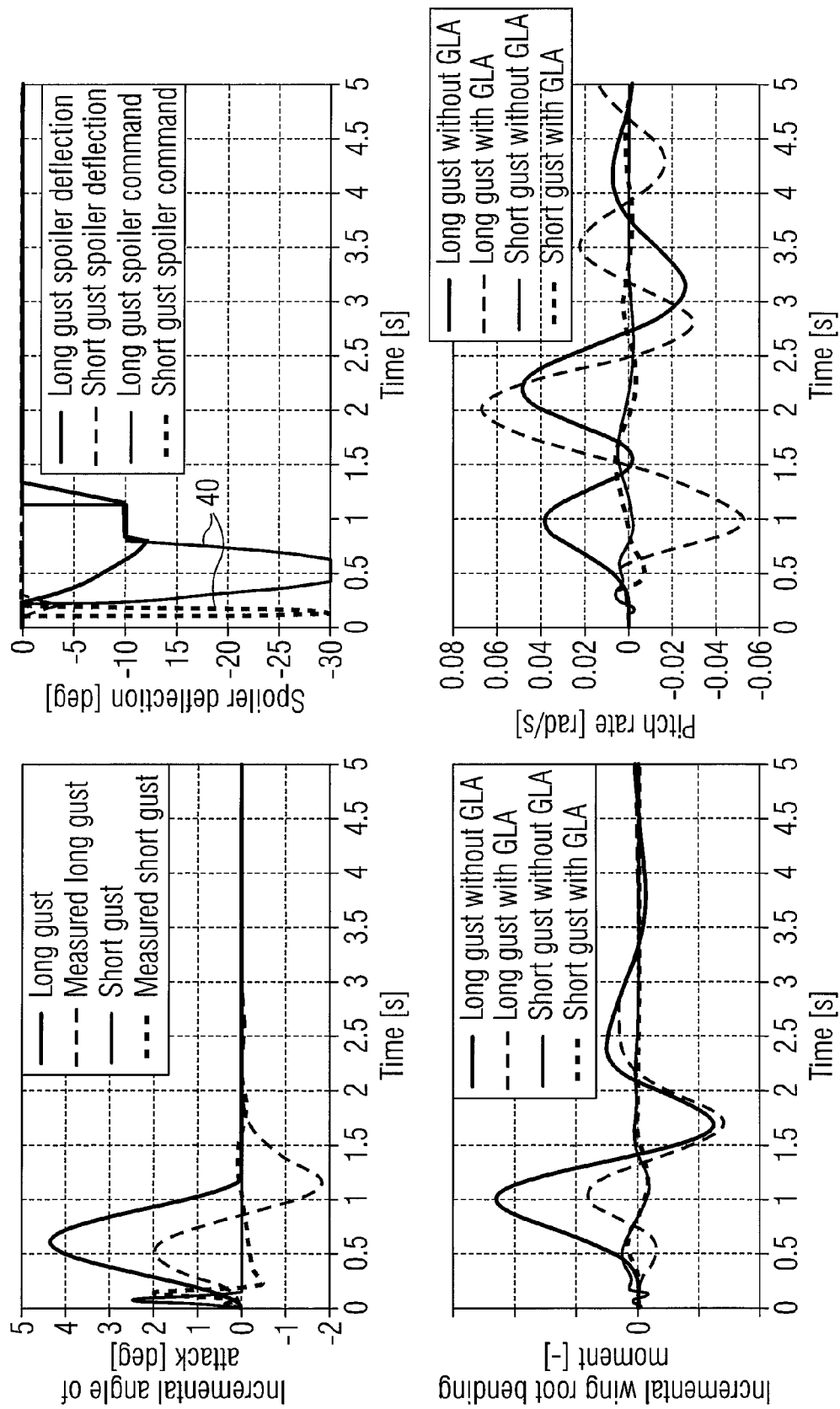
FIG. 3 show four corresponding diagrams as in FIG. 2 for a numeric simulation of a new gust load alleviation system according to an embodiment of the present invention.

FIG. 3 shows the same situation using the logic 222. Thus, FIG. 3 shows diagrams of a numeric simulation using the method and apparatus according to one embodiment of the present invention. With this embodiment of the present invention a reduction of gust loads regardless the property of the gust (such as gust length) is achieved. The gust has a strength above the prescribed value where the spoiler trigger 30 is activated so that the second control command for deflecting the second control surfaces, especially spoilers, is generated.

For the 500 feet gust a 30° spoiler (e.g. and also aileron) deflection is commanded (as well as respective elevator deflections for pitch moment compensation), see green solid line in right upper plot. This control command is generated by e.g. applying a gain on and $\alpha_{wind}$ feeding it forward to the spoilers (and applying other gains and/or delays and/or dynamic filters for commands on other control surfaces such as ailerons and elevators). Due to mass inertia and aerodynamic pressure the spoiler (as well as other control surfaces) cannot open with infinite speed, see blue solid line in right upper plot. Sometimes the input to the actuators is equipped with a rate limiter in order to limit the command rate for actuator protection. Such rate limiter would represent an artificial limit. The blue line tries to follow the green line as fast as the actuators can deflect the control surfaces and/or as much such a rate limiter allows. When the blue line finally crosses the green line, i.e. the instance when command and deflection are equal, the actuators would command to deflect the control surfaces in the opposite direction (e.g. close the spoilers again). This sign reversal of the actuator activity is identified and the control surfaces held constant in this position for a pre-defined amount of time, e.g. 0.33 seconds, see solid green and blue lines in right upper plot which remain equal and constant for some time around 1 second simulation time.

Said sign reversal can easily be identified. E.g. for hydraulic actuators the hydraulic valve position can be measured. If the valve switches this is the moment when the control surface is held constant for e.g. 0.33 seconds. For electric actuators or elector-hydraulic actuators or fly by wire systems it is even simpler since the signal for said sign is right available.

The left bottom plot shows that the incremental wing root bending moment is reduced even slightly more than in the simulation with an implementation of US20080265104, compare blue solid line (i.e. without GLAS) with blue dashed line (i.e. with GLAS).

Note, that the control surface deflection is not instantly held constant the moment the blue solid line crosses the green solid line in the right upper plot, because the identification of sign change and the switching from $\alpha_{wind}$-proportional command to constant deflection command requires a certain finite amount of time. Thus, the final control surface deflection is smaller than the maximum deflection reducing the GLAS performance.

In order to improve the performance of the GLAS the delay of holding the surface deflection constant can be made arbitrarily small by increasing the computation and/or sampling frequency of the system. However, increasing the computing and/or sampling frequency will also increase the cost of the system. Thus, there will be a trade-off. Holding the control surface constantly deflected for some time is advantageous, since the maximum deformation of the aircraft (wings respectively) is often delayed to the maximum of $\alpha_{wind}$. Still, just closing one or more control surfaces according to $\alpha_{wind}$ instead of holding them constant is also part of the teaching as disclosed herein.

For a 60 feet gust with same measured level of alphaGLA ($\alpha_{wind}$ respectively), i.e. dashed blue and red lines in left upper plot have the same maximum, also a 30° spoiler deflection is commanded (since the same gain is applied on $\alpha_{wind}$ as for the 500 feet gust). The command however is much steeper since the gust is much shorter, i.e. faster attack time. The maximum possible deflection speed of the control surfaces is the same as before, so the blue solid line and the red dashed line in the right upper plot are parallel in the beginning. For the short gust the command is so fast, that the spoiler is opened only about 3° before it is commanded to close again, see crossing of green dashed line and red dashed line. The delay for commanding a constant spoiler deflection is so large that the value to be held constant is already zero. Looking at the left bottom plot one can see that the incremental wing root bending moment is also reduced for the short gust with this embodiment of the invention (considering the spoiler already has an aerodynamic effect for such small opening angles which in real life often is not the case), compare red solid and red dashed lines.

Note that the spoiler commands (green lines) are cut of at 30° in this example, i.e. predefined maximum deflection. This cut off value is a design parameter for the GLAS and can be selected differently in order to restrict spoiler control authority, and in order to limit deflections for malfunction of the GLAS, and thus protect the wing structure from unnecessary high deflections.

Figure 4:
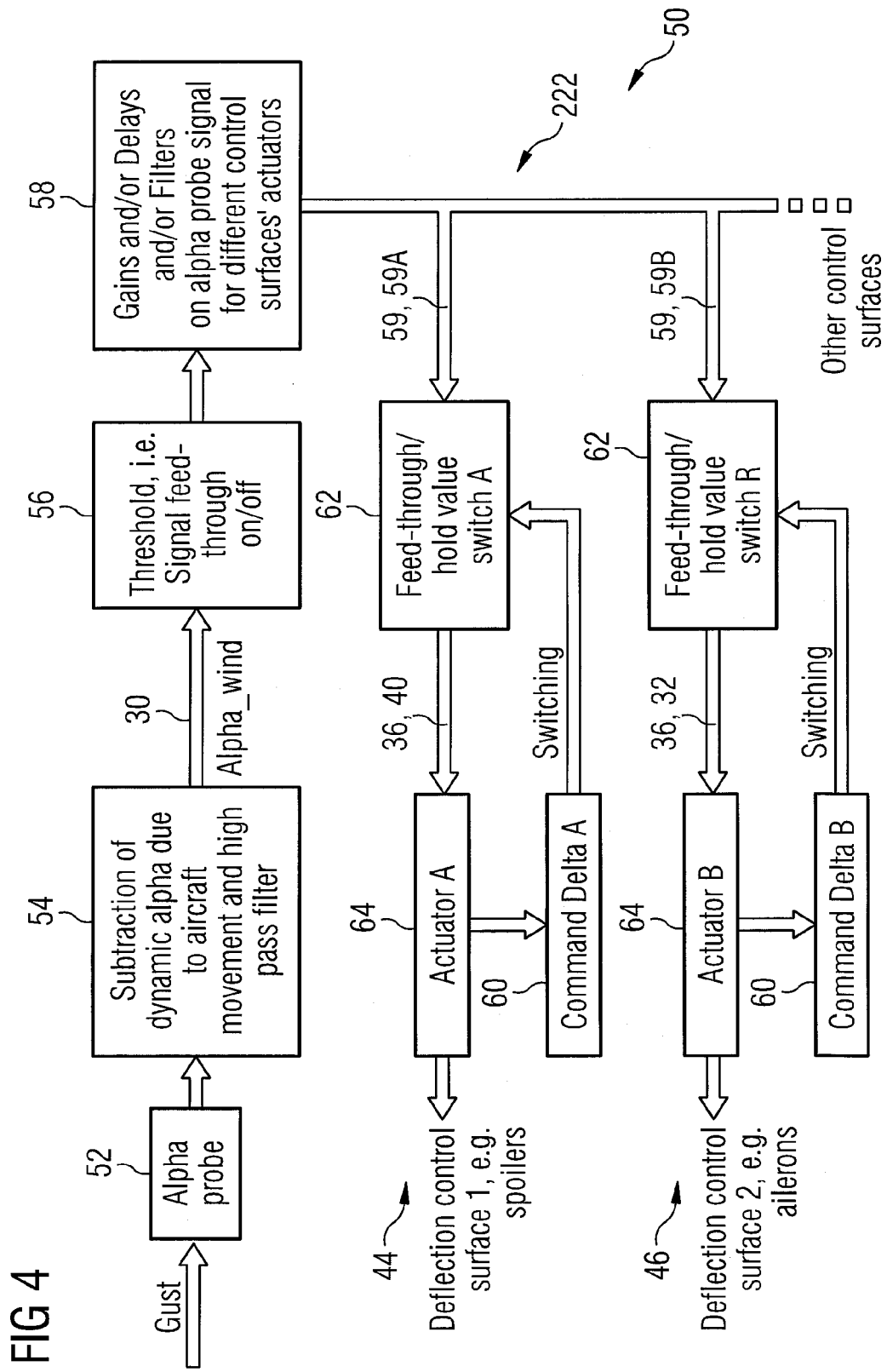
FIG. 4 shows a block diagram of a first embodiment of a gust load alleviation system (GLAS) forming an embodiment of an apparatus according to the invention.

FIG. 4 shows an example of the GLAS which forms an embodiment of the apparatus according to the invention.

The GLAS 50 is an embodiment of an apparatus for dynamically alleviating loads generated on an aircraft by a gust disturbance. From the signal of an alpha probe 52, a gust is identified by a circuit 54 which subtracts dynamic alpha due to aircraft movement and which includes a high pass filter. Thus, $\alpha_{wind}$ is provided and feed to a circuit 56 providing a threshold filter (signal feed-through ON/OFF).

The threshold for signal feed-through on/off (third block) in this example is +0.01.

Referring to FIG. 1, the pre-controlling rule circuit 6, 17 generates a first control command y for feeding into the logic 222. In case that the additional dynamic incidence angle $\alpha_{wind}$ is above a first predetermined value e.g. +0.001, but below a second predetermined value of incidence angle, namely the threshold+0.01, first control commands y are delivered directly to the first control surfaces, e.g. the symmetrically operated ailerons. Thus, loads generated by turbulences can be alleviated.

FIG. 3 and FIG. 4 show cases when $\alpha_{wind}$ exceeds this second predetermined value of incidence which only occurs for a short time when a gust is present. In such cases, the first control command y is not used and the adaptation of the pre-controlling rule circuit is temporarily stopped, and $\alpha_{wind}$ is used instead for controlling the second control surfaces. FIG. 4 shows examples of control elements 44, 46 for different second control surfaces. As used herein, "first control surfaces" are denoting control surfaces that are actuated in a more continuous way, for example for an oscillating movement while "second control surfaces" are control surfaces that are deflected in a more impulse-like manner. Some control surfaces such like ailerons or elevators may act both as first control surfaces and as second control surfaces. Some control surfaces, especially spoilers, normally are only used as second control surfaces. Thus, a first type of second control surface A indicated in FIG. 4 may be spoilers while a second type of second control surface B indicated in FIG. 4 may be ailerons.

For controlling the second control surfaces in case of a gust, the control scheme of FIG. 4 is used where the alpha probe signal $\alpha_{wind}$ (output of block 54) is used for controlling the second control surfaces.

The block 58 (contained in logic 222) adds gains and/or delays and/or filters in this alpha probe signal and generates control command signals 59, 59A, 59B as basis for generating second control signals 36 for different control surface actuators to make the optimum use of any control surface. For example, a control command signal 59A adapted to an optimum use of spoilers and a control command signal 59B adapted to an optimum use of ailerons (to be deflected for alleviation of the gust load) is generated. Further, a command delta between the corresponding control command signal 59, 59A, 59B and the present condition of the corresponding actuator is determined by a command difference detection means 60 and used to control feed-through/hold values switches 62 which actuate the corresponding actuator 64. Hence, at the output of the switches 62 (contained in logic 222) the second control commands 36 are provided.

In a first mode of the switch 62, the actuator 64 is fed with the control command signal 59 (output of block 58). In a second mode of the switch 62, the actuator 64 is fed with a constant value wherein an initial value of the control command signal 59 at the start of this mode is held constant. The switch 62 switches between these two modes dependent on command delta provided by command difference detection means 60. The result of the switching is seen in FIG. 3, right upper graph.

In FIG. 4, a spoiler control element 44 for deflecting spoilers and a aileron control element 46 for deflecting ailerons are shown as examples for the control of different types of second control surfaces. Both control elements 44, 46 comprise a corresponding actuator 64, a command difference detection means 60 for providing the command delta and a feed-through/hold value switch 62.

The command delta can be used as indicated in FIG. 3 to adapt the deflection of one particular type of control surface such like spoilers to the length of the gust.

Alternatively the "command delta" of one actuator 64 can also be used for the "feed-through/hold value" switches 62 of one or more other control surfaces. It is advantageous to design the GLAS 50 to switch to "hold" if the "command delta" goes to "close actuator" AND the actuator command is unequal zero. Otherwise, if the actuator deflection is zero, any noise in the system will make the switch permanently switch on and off.

Further alternative would be to do the "feed-through/hold value" switching by identifying the gradient of (filtered) $\alpha_{wind}$, i.e. as long as incremental alpha due to gust is increasing, open the control surfaces, if incremental alpha due to gust is decreasing, then hold constant the control surfaces for some prescribed time, e.g. 0.33 seconds.

Another alternative would be to additionally identify when $\alpha_{wind}$ goes below a certain threshold (e.g. +0.01) and in that moment switch the "feed-through/hold value switch" to hold constant the control surfaces for some prescribed time, e.g. 0.33 seconds.

It is advantageous to consider in the logic 222 of the GLAS 50 (e.g. in the gains, delays and filters) that spoilers are generally ineffective unless they are opened a view degrees.

In the following it is shown that the GLAS 50 as embodiment of the present invention can even handle downdraft gust with spoilers just on the upper side of the wings.

Figure 5:
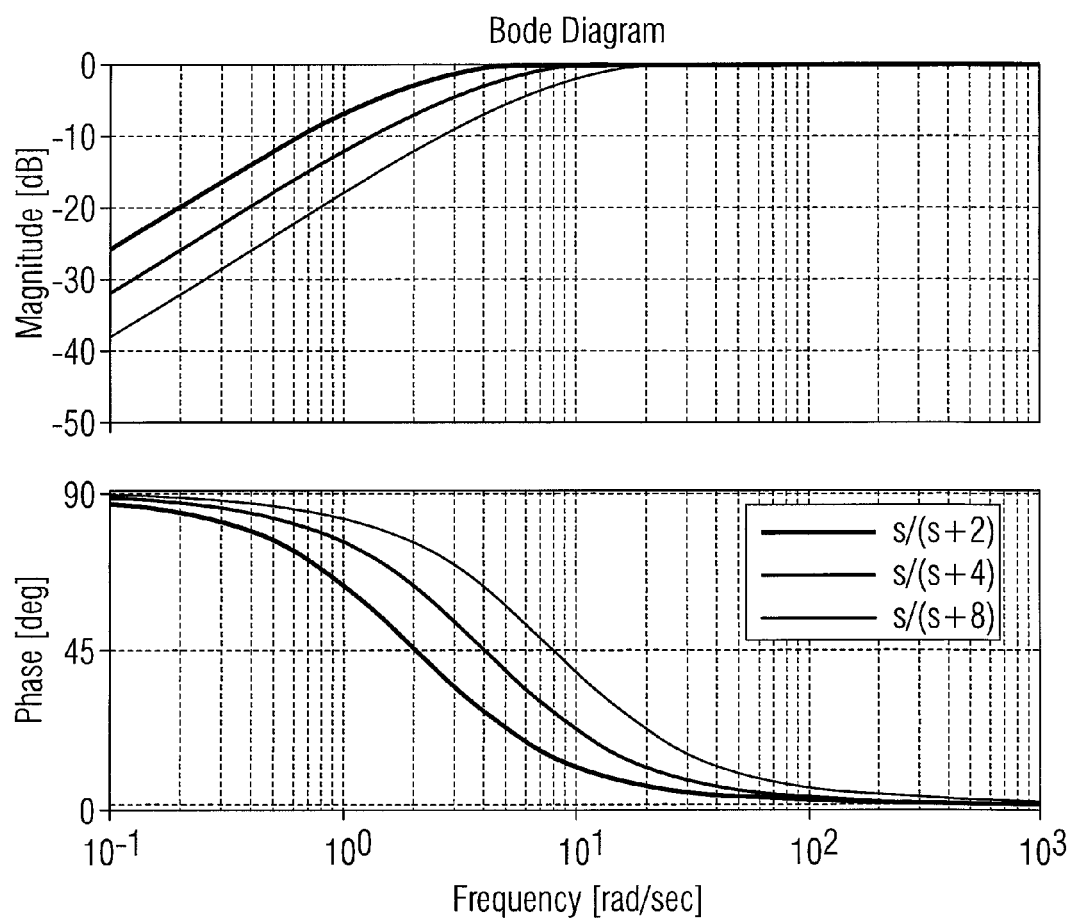
FIG. 5 shows transfer functions of different high pass filters.

To achieve the latter, it is important to choose the right high pass filter for $\alpha_{wind}$, see FIG. 5. FIG. 5 shows a diagram of the frequency characteristic of several possible high pass filters. In this example the high pass filter with transfer function of $s/(s+4)$ was selected, where s is the Laplace variable.

Figure 6:
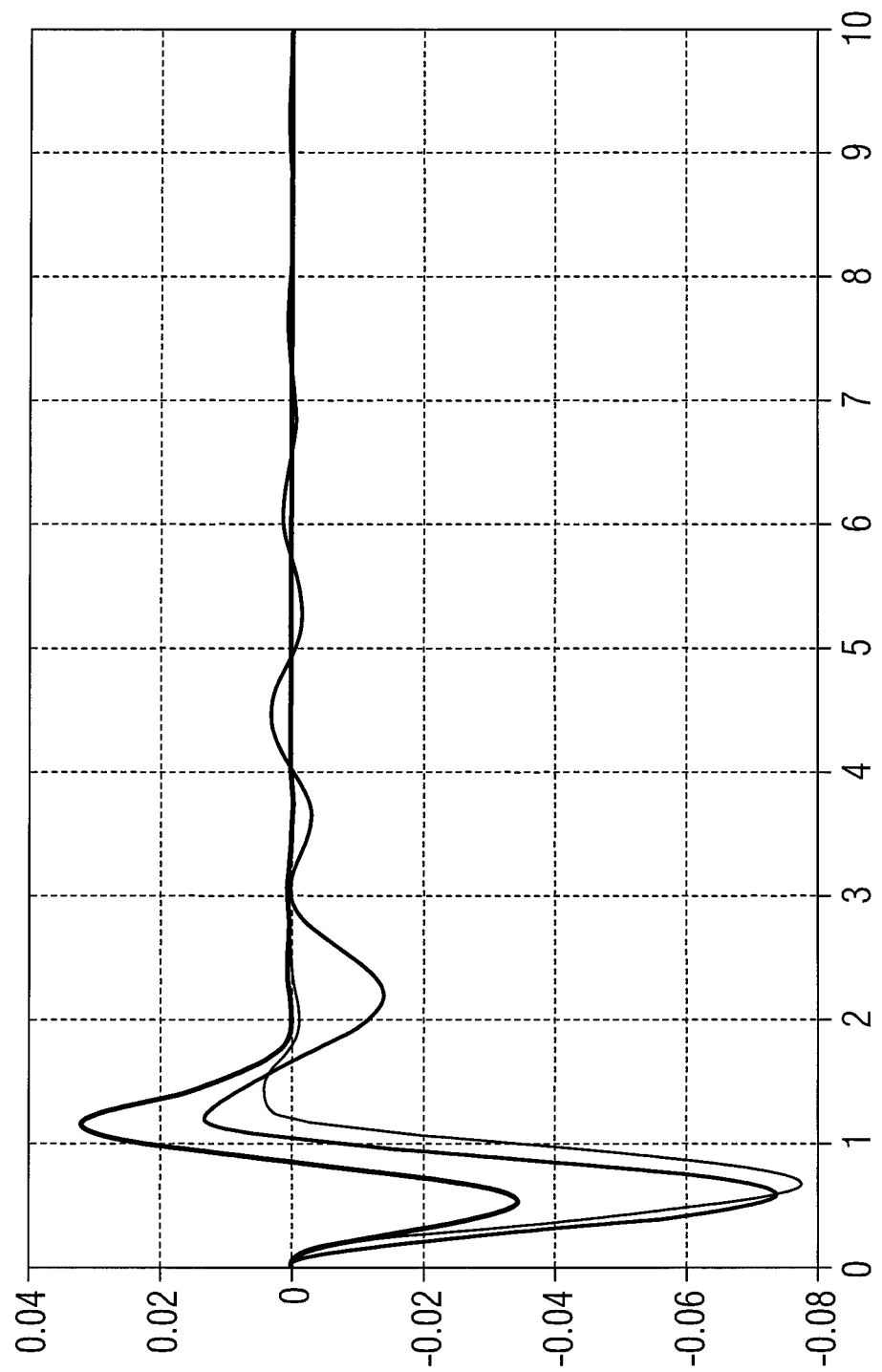
FIG. 6 shows signals of the gust identification for a 500 feet downdraft gust.

FIG. 6 shows how this high pass manipulates the measurement of a downdraft gust, i.e. down blow. The yellow line is the direct measurement of the alpha probe, i.e. $\alpha_{air}$. With compensation of aircraft movement one obtains $\alpha_{wind}+\alpha_0$, compare Eq. 1. The magenta line in FIG. 6 is $\alpha_{wind}+\alpha_0$ with measurement delay. The cyan line represents this signal filtered by the high pass. When the downdraft gust is encountered at first no spoiler deflections are commanded, since spoiler can only be deflected upwards. Note, that elevator and aileron deflections can be commanded. If lower surface spoilers are available those can also be deflected.

The moment the cyan line passes the threshold of +0.01 at about 0.88 seconds the spoilers are commanded to deflect upwards using same gains as for the updraft gust. Other control surfaces such as elevators and ailerons are deflected accordingly. As for the updraft gust, the moment the control surfaces would be commanded to deflect in the other direction, they are just held constant in their position for a predefined time, e.g. for 0.33 seconds.

Figure 7:
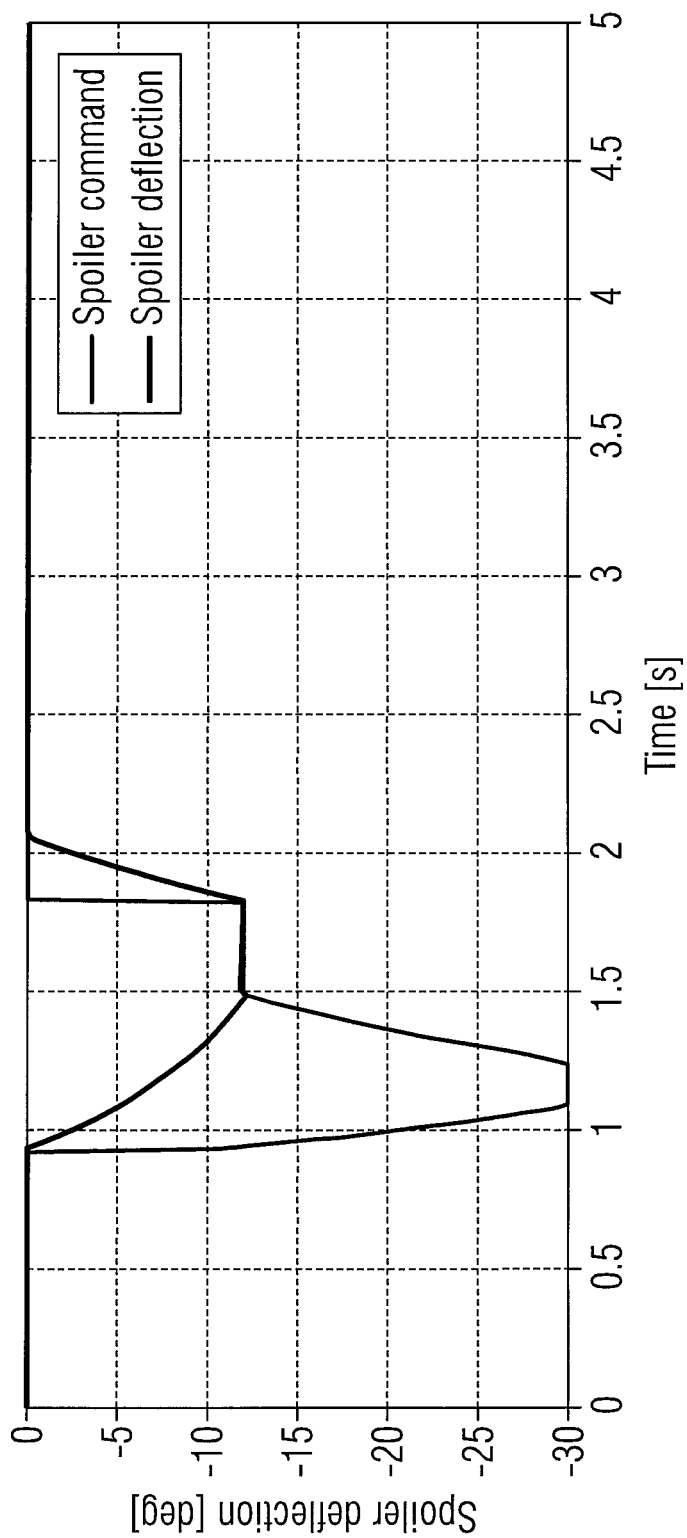
FIG. 7 shows spoiler command and actual deflection for a 500 feet downdraft gust.

The spoiler command and actual deflection is illustrated in FIG. 7. Note that the deflection of the spoiler does not start before 1 second simulation time for the downdraft gust.

Figure 8:
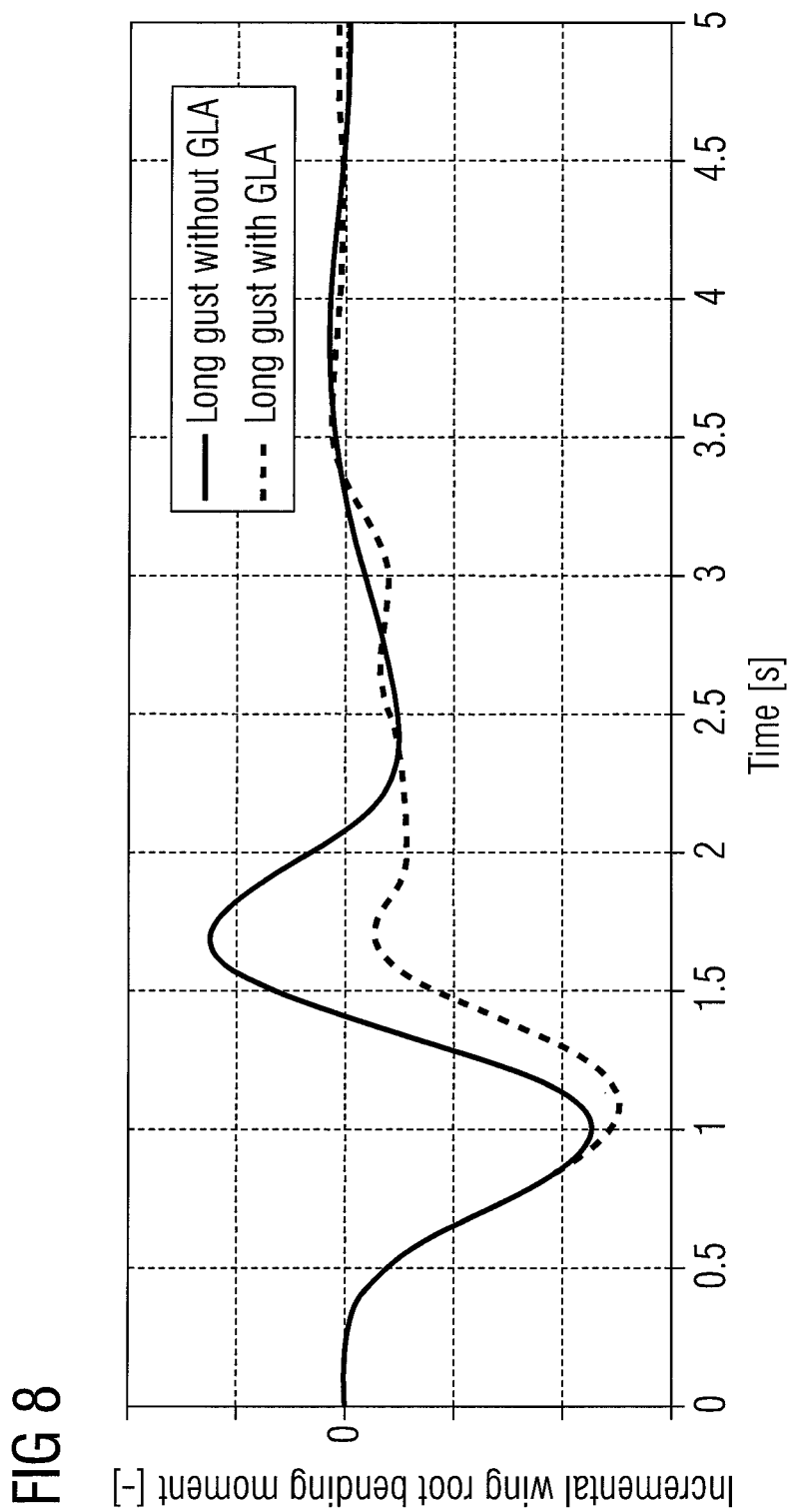
FIG. 8 shows the incremental wing root bending moment in a 500 feet downdraft gust.

FIG. 8 shows the reduction of the incremental wing root bending moment. The positive incremental wing root bending moment is highly reduced. For the negative peak (down bending) slight increase is experienced. Some optimization is required here. For the 60 feet gust the threshold of +0.01 is not exceeded, and thus the GLAS is not activated.

Figure 9:
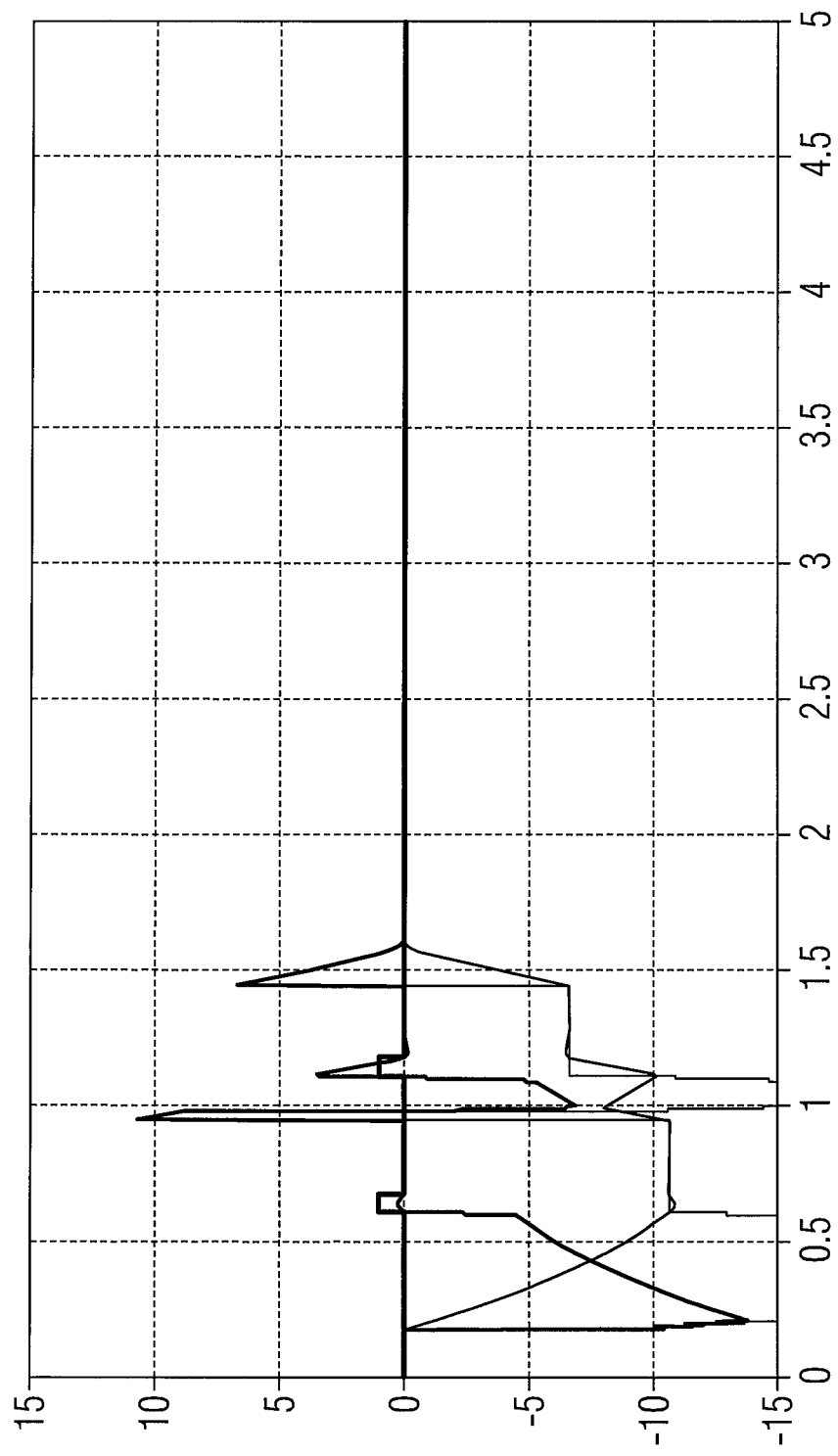
FIG. 9 shows a graph of a spoiler command, of an actual spoiler deflection, of the delta between spoiler command and spoiler deflection and of the condition of a switch for a spoiler activator in a multiple gusts example.

In the following it will be shown that the GLAS as described is also functioning for multiple gusts. FIG. 9 shows a multiple gusts example wherein the magenta line represents the spoiler command, the cyan line represents the spoiler deflection, the red line represents the delta between the spoiler command and the spoiler deflection and hence represents the command delta, and the yellow line represents the "Feed-through/hold value switch".

The moment a first gust hits the alpha probe, and after "Subtraction of dynamic alpha due to aircraft movement and high pass filter" ($2^{nd}$ block in FIG. 4) is strong enough to exceed the threshold ($3^{rd}$ block in FIG. 4) the GLAS is activated and reduces the gust loads. When the "command delta" changes to "close control surface" the command is held for e.g. 0.33 seconds and then goes to zero. If a second gust hits the alpha probe the GLAS is activated again. FIG. 9 shows the GLAS reaction to 350 feet gust followed by a 150 feet gust after 0.8 seconds.

Note, that in this example the spoiler command is artificially limited to 15°. This value can be adapted during flight depending on e.g. true airspeed, Mach number and/or altitude, and/or aircraft weight, e.g. fuel tanks filling level, in order to restrict commands in the case of GLAS malfunction.

Figure 10:
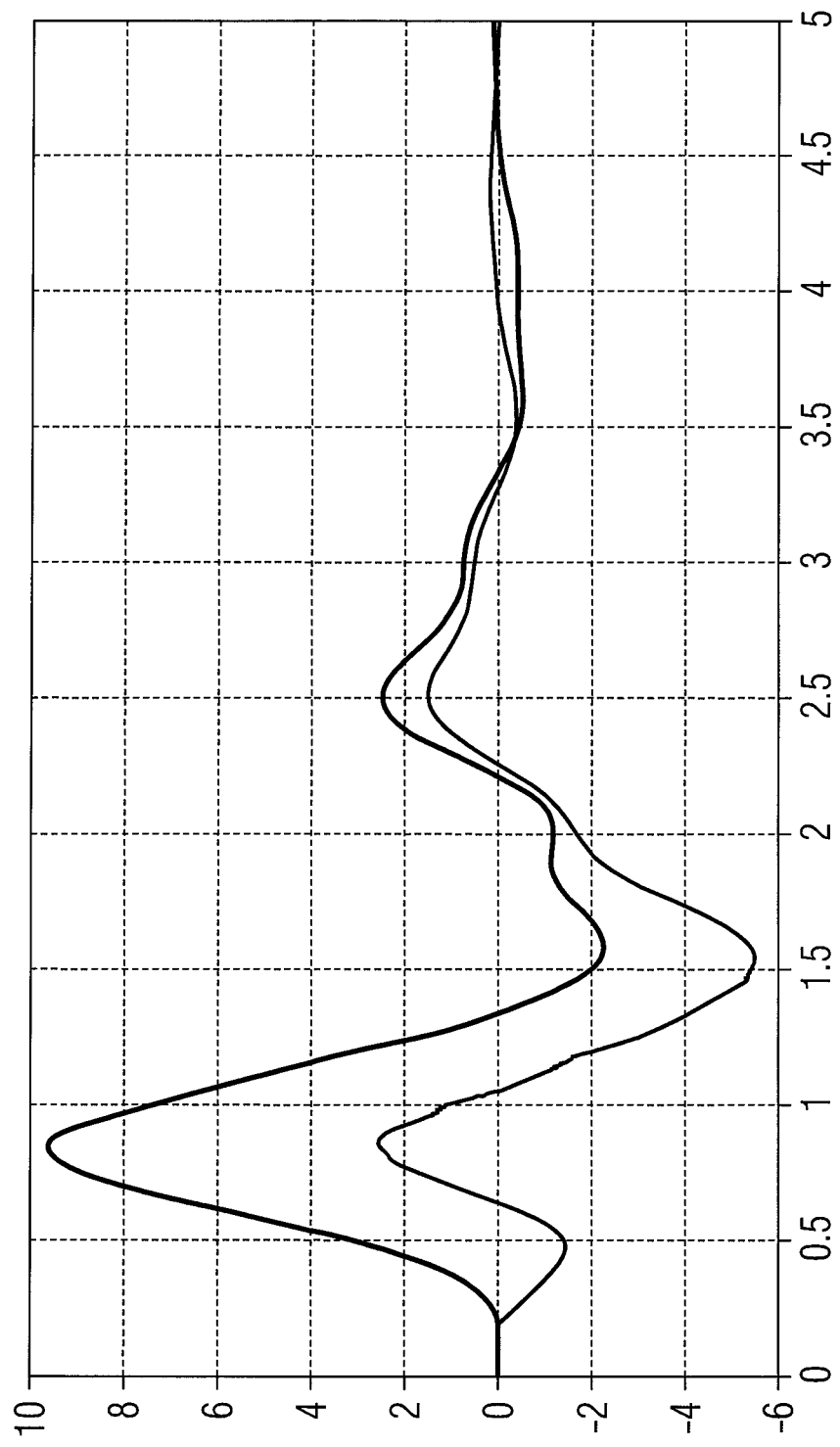
FIG. 10 shows, for the multiple gusts example of FIG. 9, a graph of an incremental wing root bending moment without the GLAS according to an embodiment of the invention and of an incremental wing root bending moment with the GLAS according to an embodiment of the invention.

FIG. 10 shows the respective reduction of incremental wing root bending moment in the multiple gusts example of FIG. 9. In FIG. 10, the yellow line represents the incremental wing root bending moment without GLAS, and the magenta line represents the incremental wing root bending moment with GLAS.

Considering multiple gusts, the optimization of GLAS parameters, such as gains, delays, filters, thresholds, hold times for the different control surfaces, such as spoilers, elevators, ailerons, etc, needs to be done by checking critical loads for all possible combinations of gusts in terms of gust strength, gust properties, such as e.g. gust gradient distance, and time between two, or more sequenced gusts.

Figure 11:
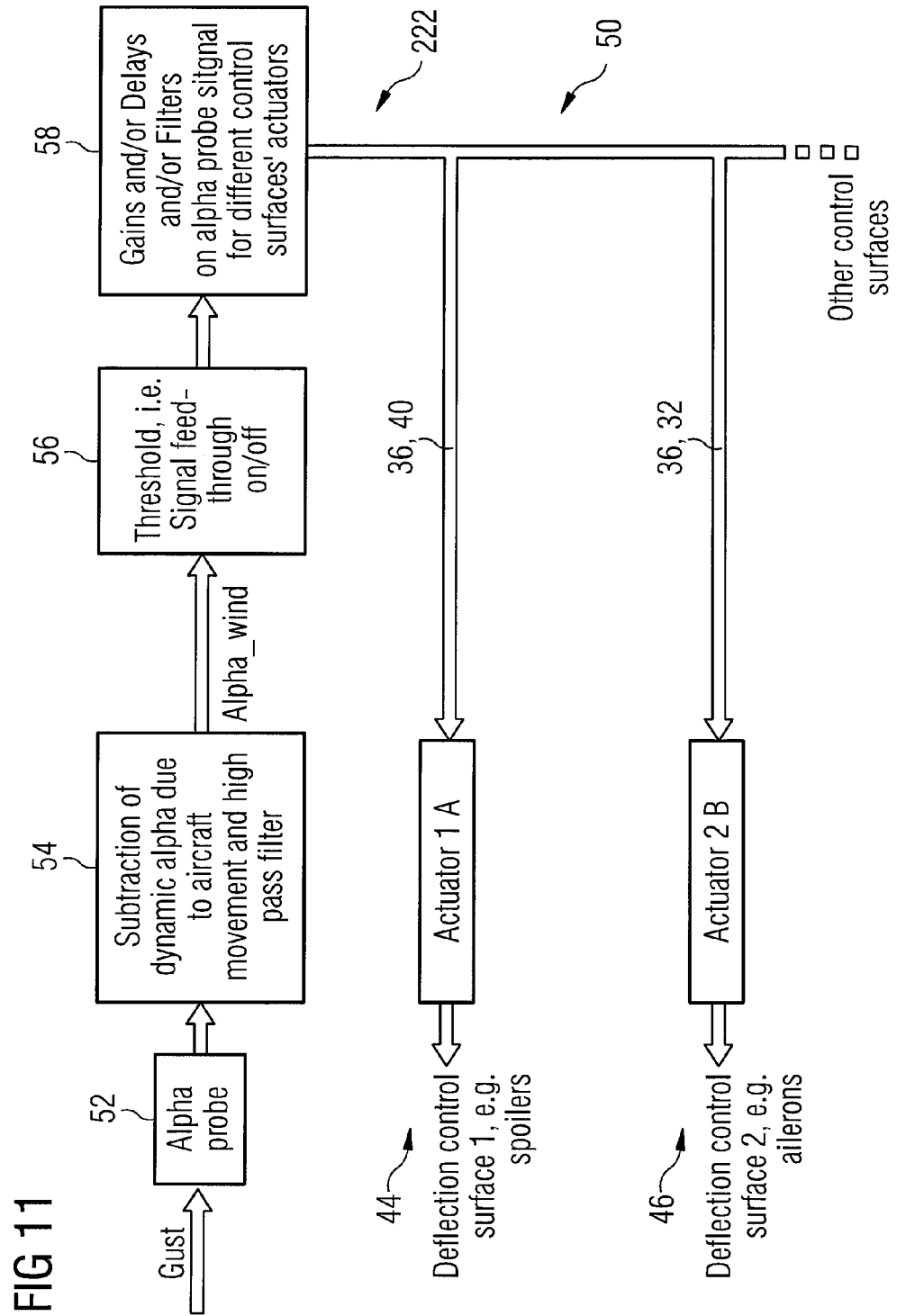
FIG. 11 shows a block diagram similar to FIG. 4 for a further embodiment of a GLAS, forming a further embodiment of an apparatus according to the invention.

FIG. 11 shows a block diagram similar to FIG. 4 for a further embodiment of the GLAS 50. According to this further embodiment, the adjustment of second control commands, e.g. 36, 40, 32, to gust properties (such as gust length) can also be done by choice of filters in block 58 without using switch means 62, and command delta blocks 60. In an advantageous embodiment filters in block 58 comprise one or more Finite Impulse Response (FIR) filters which are optimized in order to provide second control commands such as 36, 40, 32 dependent on gust properties such as the gust length.

In an advantageous embodiment, such FIR filters are optimized in order to minimize the L-infinity norm (or a weighted sum of L-infinity norms) of the error signal "e", (e.g. total wing bending moment, strains, stresses, and/or accelerations) for gusts of different properties (such as different gust lengths) at the same time. In such optimization different gusts are weighted dependent on the amount of their effect on error signal "e".

Figure 12:
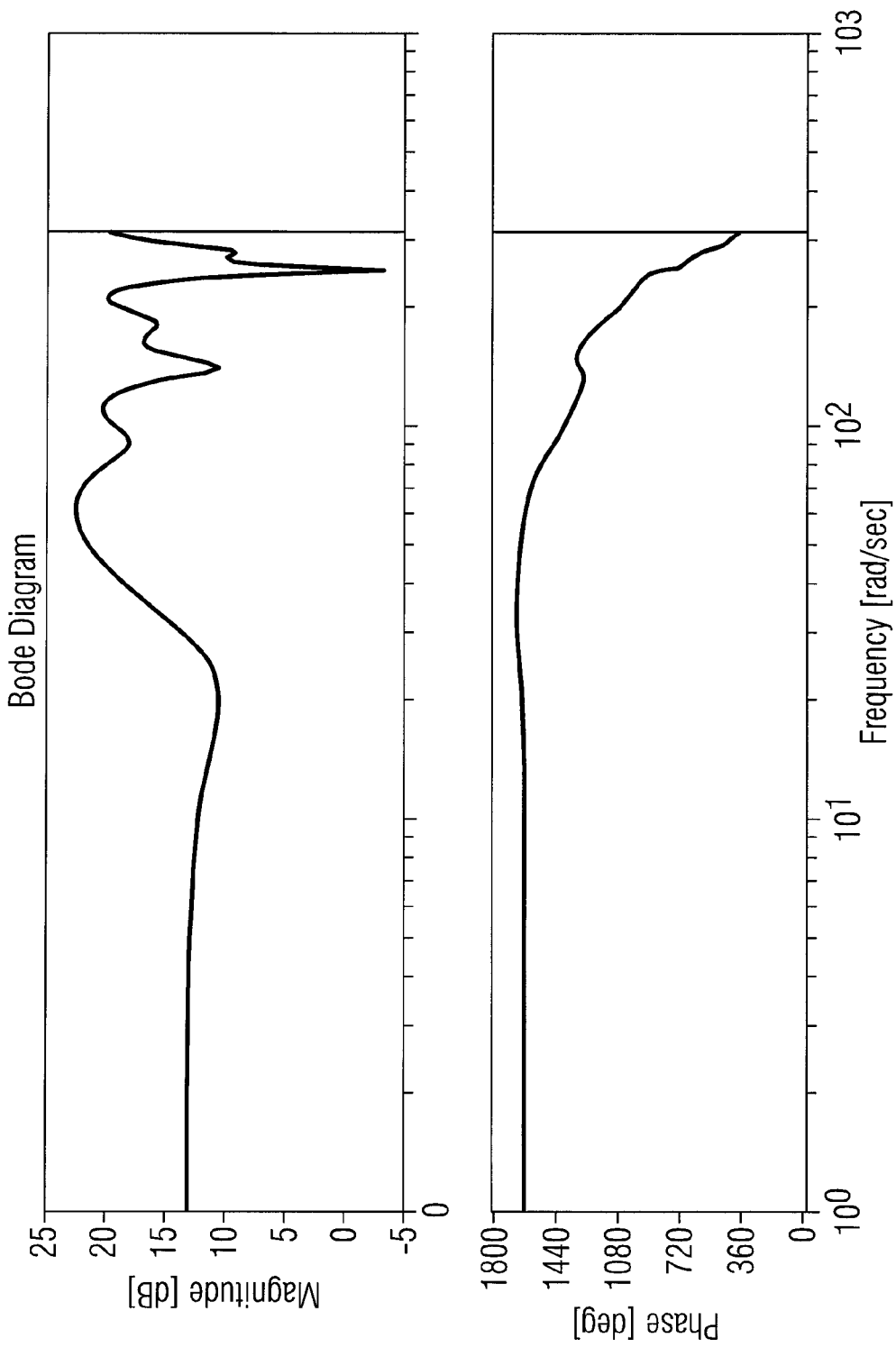
FIG. 12 shows a transfer function of a filter used in the GLAS of FIG. 11 to adapt a control command to a gust length.

As one example, FIG. 12 shows a bode plot of discrete transfer function of an FIR filter for generating aileron second commands 32. The basic behavior of said filter is a high pass. Since the GLAS 50 is open loop, no stability problems are to be expected from the high gains at high frequencies. Moreover since second control commands are only activated if threshold switch of block 56 is on (which is only true if alpha_wind exceeds a certain threshold which happens only for a short time during a gust), sensor noise in block 52 is not expected to negatively affect the actuators.

Figure 13:
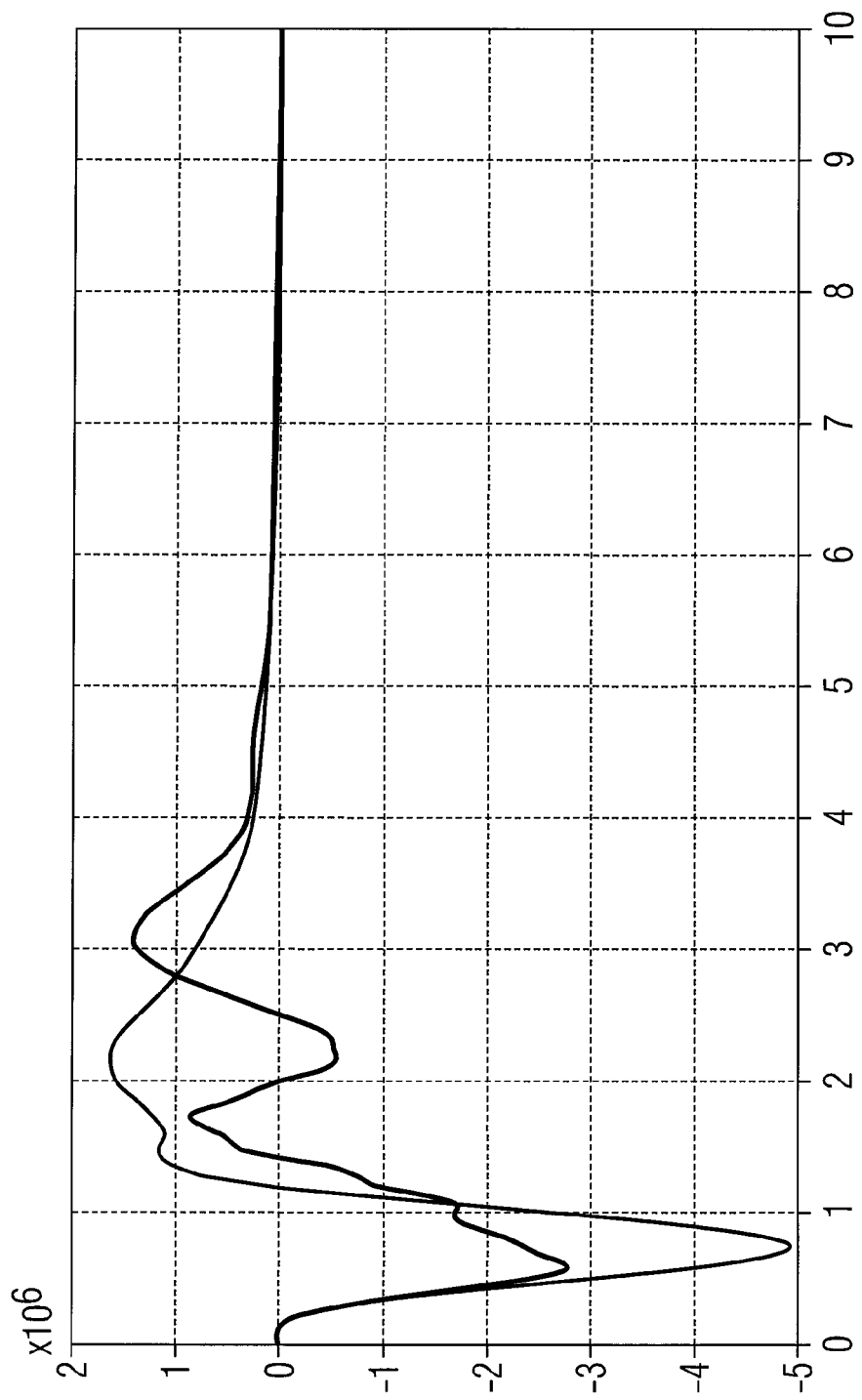
FIG. 13 shows the incremental wing root bending moment for the GLAS of FIG. 11 for a long gust of 500 feet.

FIG. 13 shows results of a numeric simulation of the incremental wing bending for a 500 feet gust, wherein the yellow line shows the situation without GLAS, and the cyan line shows the situation with the GLAS 50 according to embodiment of FIG. 11.

FIG. 14 shows results of a numeric simulation of the incremental wing bending for a 250 feet gust, wherein the yellow line shows the situation without GLAS, and the cyan line shows the situation with the GLAS 50 according to the embodiment of FIG. 11.

FIG. 15 shows results of a numeric simulation of the incremental wing bending for a 60 feet gust, wherein the yellow line shows the situation without GLAS, and the cyan line shows the situation with the GLAS 50 according to the embodiment of FIG. 11.

The results of numeric simulations show that incremental wing bending of long gusts of 500 feet, as shown in FIG. 13, and 250 feet, as shown in FIG. 14 are reduced, while short gusts of 60 feet, as shown in FIG. 15 remain untouched.

The invention claimed is:

1. An apparatus for dynamically alleviating loads generated on an aircraft, comprising:
   a sensor configured to automatically detect a disturbance due to gust and provide a parameter representing the angle of attack of the disturbance;
   a control command generator configured to automatically generating control commands for deflecting a control surface dependent on the angle of attack;
   first actuators configured to activate first control surfaces responsive to the control commands and second actuators configured to deflect second control surfaces, the control command generator being configured to generate first control commands for actuating the first control surfaces and second control commands for deflecting the second control surfaces; and
   a comparator configured to compare the angle of attack with a predetermined value, the control command generator being configured to generate the first control command when the angle of attack is below or equal to the predetermined value and to generate the second control command when the angle of attack is above the predetermined value.

2. An apparatus for dynamically alleviating loads generated on an aircraft by a disturbance, comprising:
   a sensor configured to automatically detect a disturbance due to gust and provide a parameter representing the angle of attack of the disturbance; and
   a controller including a control command generator configured to automatically generating control commands to deflect a control surface dependent on the angle of attack, and control allocation logic to adapt the control commands to the amount of the angle of attack and to a gust length representing a duration of the gust over time.

3. An apparatus according to claim 2, wherein the control allocation logic is configured to adapt at least one of a deflection angle and a deflection hold time for the control surface to the gust length.

4. An apparatus according to claim 2, further comprising a switch configured to switch an input to an activator of the control surface, the switch means being configured to switch between a feed through mode for feeding a control command signal to the activator and a hold value mode for holding a value of the control command signal constant and for feeding this constant value to the activator for a predetermined holding time.

5. An apparatus according to claim 2, wherein the control allocation logic comprises
   a command difference detector configured to determine a difference between the control command generated by the control command generator and an actual deflection of the control surface, such that the control allocation logic is configured to adapt the control command in response to a difference determined by the command difference detector.

6. An apparatus according to claim 2, further comprising first actuators configured to activate first control surfaces responsive to the control commands and second actuators configured to deflect second control surfaces, the control command generator being configured to generate the control commands to include first control commands for actuating the first control surfaces and second control commands for deflecting said second control surfaces; and a comparator configured to compare the angle of attack with a predetermined value, the control command generator being configured to generate the first control command when the angle of attack is below or equal to the predetermined value and to generate the second control command when the angle of attack is above the predetermined value.

7. An apparatus according to claim 4, wherein
the switch is coupled to the command difference detector to switch between the feed-through mode and the hold value mode dependent on the difference determined by the command difference detector.

8. An apparatus according to claim 6, wherein
the first control surface actuated in response to the first control command is one of an aileron surface and an elevator control surface, and the second control surface deflected in response to the second control command is one of a spoiler control surface, an upper wing spoiler control surface, a lower wing spoiler control surfaces surface, an aileron control surface, and an elevator control surface.

9. A method of dynamically alleviating loads generated on an aircraft by a disturbance, the method comprising:
monitoring, during flight of the aircraft, to automatically detect a disturbance due to at least one of gust and turbulence and determine an angle of attack of the disturbance;
when the disturbance is detected, automatically generating control commands to deflect control surfaces dependent on the angle of attack in order to dynamically alleviate loads generated on the aircraft by the disturbance;
applying the control commands to deflect the control surfaces accordingly; and
adapting the control commands based on an amount of the angle of attack and a gust length representing a duration of the gust over time to adapt the deflection of the control surfaces both to the angle of attack and the gust length.

10. A method according to claim 9, wherein
during the adapting at least one of a deflection angle and a deflection hold time for the control surface is adapted to the gust length measured over time.

11. A method according to claim 9, wherein the adapting comprises
comparing the control command and an actual deflection of the control surface;
detecting when the actual deflection of the control surface matches the control command;
checking, after a delay time starting with detection of a match, whether the control command still is present by determining whether the control command exceeds a limit or is still unequal to zero; and
holding the control surface constant for a prescribed holding time in case that the control command still is present, and retracting or closing the control surface in case that the control command is not present after the delay time.

12. A method according to claim 9, wherein the adapting comprises:
identifying a gradient of the angle of attack;
generating the control commands to open the control surface when the angle of attack is increasing; and
generating the control commands to hold the control surface constant for a prescribed holding time when the angle of attack is decreasing.

13. A method according to claim 9, wherein the adapting comprises:
identifying when the angle of attack goes below a certain threshold and, if so, generating the control commands to hold the control surface constant for a prescribed holding time.

14. A method according to claim 9, wherein the adapting comprises:
generating a signal indicative of the external excitation, applying the signal to a filter that is responsive to the time length of the signal, and using the filtered signal to generate the control commands adapted to the gust length.

15. A method according to claim 9, wherein the generating of the control commands comprises:
generating first control commands for first control surfaces and second control commands for second control surfaces;
comparing the angle of attack with a predetermined value;
generating the first control commands to activate the first control surface when the angle of attack is below or equal to this predetermined value; and
generating the second control commands to add a deflection of the second control surfaces when the angle of attack is above the predetermined value.

16. A method according to claim 10, wherein the adapting comprises
comparing the control command and an actual deflection of the control surface;
detecting when the actual deflection of the control surface matches the control command;
checking, after a delay time starting with detection of a match, whether the control command still is present by determining whether the control command exceeds a limit or is still unequal to zero; and
holding the control surface constant for a prescribed holding time in case that the control command still is present, and retracting or closing the control surface in case that the control command is not present after the delay time.

17. A method according to claim 10, wherein the adapting comprises:
identifying a gradient of the angle of attack;
generating the control commands to open the control surface when the angle of attack is increasing; and
generating the control commands to hold the control surface constant for a prescribed holding time when the angle of attack is decreasing.

18. A method of dynamically alleviating loads generated on an aircraft by a disturbance, the method comprising:
monitoring, during flight of the aircraft, to automatically detecting a disturbance due to at least one of gust and turbulence and determine an angle of attack of the disturbance;
when the disturbance is detected, automatically generating control commands to deflect control surfaces dependent on the angle of attack in order to dynamically alleviate loads generated on the aircraft by the disturbance, the generating of the control commands comprising
generating first control commands for first control surfaces and second control commands for second control surfaces;
comparing the angle of attack with a predetermined value;
generating the first control commands to activate the first control surface when the angle of attack is below or equal to this predetermined value; and
generating the second control commands to add a deflection of the second control surfaces when the angle of attack is above the predetermined value; and applying the control commands to deflect the control surfaces accordingly.

19. A method according to claim 15, wherein the first control commands include
- at least one of aileron control commands for actuating an aileron control surface and elevator control commands for actuating an elevator control surface; and
- the second control commands include spoiler control commands for deflecting spoiler control surfaces arranged on at least one of an upper and lower surface of a wing of the aircraft.

20. A method according to claim 19, the second control commands further include at least one of aileron control commands for deflecting an aileron control surface and elevator control commands for deflecting an elevator control surface.

* * * * *